(12) United States Patent
Ganesan et al.

(10) Patent No.: US 11,782,814 B2
(45) Date of Patent: Oct. 10, 2023

(54) VISUALIZATIONS FOR LEARNED SOFTWARE INTERFACES

(71) Applicant: Oracle International Corporation, Redwood Shores, CA (US)

(72) Inventors: Dharmalingam Ganesan, Crofton, MD (US); David M. Clifton, Ellicott City, MD (US)

(73) Assignee: Oracle International Corporation, Redwood Shores, CA (US)

( * ) Notice: Subject to any disclaimer, the term of this patent is extended or adjusted under 35 U.S.C. 154(b) by 307 days.

(21) Appl. No.: 17/141,318

(22) Filed: Jan. 5, 2021

(65) Prior Publication Data

US 2022/0214959 A1 Jul. 7, 2022

(51) Int. Cl.
*G06F 11/36* (2006.01)
*G06F 8/77* (2018.01)

(52) U.S. Cl.
CPC ............ *G06F 11/3612* (2013.01); *G06F 8/77* (2013.01); *G06F 11/3664* (2013.01); *G06F 11/3696* (2013.01)

(58) Field of Classification Search
None
See application file for complete search history.

(56) References Cited

U.S. PATENT DOCUMENTS 5,983,016 A * 11/1999 Brodsky ............ G06F 11/3664
714/E11.217
6,219,826 B1 * 4/2001 De Pauw ............ G06F 11/323
714/E11.181
8,719,190 B2 * 5/2014 El-Rafei ............ G06F 11/0715
706/12
8,719,796 B2 * 5/2014 Rosu ..................... G06F 11/302
717/130
9,658,943 B2 * 5/2017 Gounares ............ G06F 11/3664
11,037,342 B1 * 6/2021 Agnew ............... G06F 3/04847
2002/0112225 A1 * 8/2002 Charisius .................. G06F 8/20
717/125

(Continued)

FOREIGN PATENT DOCUMENTS

EP 2238532 A4 4/2012

OTHER PUBLICATIONS

P. S. C. Alencar, D. D. Cowan and C. J. P. Lucena, "A logical theory of interfaces and objects," in IEEE Transactions on Software Engineering, vol. 28, No. 6, pp. 548-575, Jun. 2002, doi: 10.1109/TSE.2002.1010059. (Year: 2002).*
Barnett, Better API testing with the OpenAPI Specification, Better API testing with the OpenAPI Specification | Opensource.com, https://opensource.com/article/18/6/better-api-testing-openapi-specification, Jun. 12, 2018, pp. 1-7.

(Continued)

*Primary Examiner* — Andrew M. Lyons
(74) *Attorney, Agent, or Firm* — Potomac Law Group, PLLC

(57) ABSTRACT

Embodiments learn and visualize a software component and interface. Software code including a series of events can be received, where the series of events include calls to a software component and interface under test. Supplemental code can be injected into the received code. The software code with the injected supplemental code can be executed, where the executed supplemental code generates state data for the software component and interface. Based on the generated state data, a state diagram visualization can be generated that visualizes states and state transitions for the software component and interface under test given the series of events.

17 Claims, 16 Drawing Sheets

(56) References Cited

U.S. PATENT DOCUMENTS

| | | | | |
|---|---|---|---|---|
| 2003/0066055 A1* | 4/2003 | Spivey | ............... | G06F 11/3447 714/E11.178 |
| 2004/0225919 A1* | 11/2004 | Reissman | ........... | G06F 11/3604 714/38.12 |
| 2005/0081192 A1* | 4/2005 | DeLine | ............... | G06F 11/3604 717/126 |
| 2006/0129995 A1* | 6/2006 | DeBoe | ................ | G06F 11/3612 717/148 |
| 2006/0161833 A1* | 7/2006 | Chandra | ............ | G06F 11/3688 714/763 |
| 2009/0037884 A1* | 2/2009 | Benameur | ........... | G06F 11/3608 717/126 |
| 2009/0070746 A1* | 3/2009 | Dhurjati | ............. | G06F 11/3676 717/124 |
| 2011/0041117 A1* | 2/2011 | Grechanlk | ................ | G06F 8/34 717/104 |
| 2011/0078704 A1* | 3/2011 | Mishali | ............... | G06F 11/3089 719/318 |
| 2014/0215443 A1* | 7/2014 | Voccio | .................. | G06F 16/245 717/128 |
| 2018/0034779 A1* | 2/2018 | Ahuja | ................. | H04L 63/0236 |
| 2018/0039570 A1* | 2/2018 | Rajagopalan | ....... | G06F 11/3676 |
| 2018/0314622 A1 | 11/2018 | Lowe et al. | | |

OTHER PUBLICATIONS

Das Modak, Consumer-driven Contract Testing using Postman | by Kaustav Das Modak | Better Practices | Medium, Oct. 24, 2018, pp. 1-13.

De Caso et al., Automated Abstractions for Contract Validation, Digital Object Indentifier 10.1109/TSE.2010.98, This article has been accepted for publication in a future issue of this journal, but has not been fully edited. Content may change prior to final publication, Transactions on Software Engineering, pp. 1-23, last downloaded on Sep. 3, 2020.

Guth et al., Specification Mining for Smart Contracts with Automatic Abstraction Tuning; pp. 1-12, Jul. 20, 2018.

Pillgram-Larsen, Validating API Contracts, https://www.linkedin.com/pulse/validating-api-contracts-jens-pillgram-larsen, pp. 1-4, last downloaded on Sep. 3, 2020.

Unknown, APIs that Document and Test Themselves, https://www.useoptic.com, last downloaded on Sep. 3, 2020, pp. 1-7.

Vaandrager, Model Learning Emerges as an Effective Method for Black-Box State Machine Models of Hardware and Software Components; review articles; DOI: 10.1145/2967606, Communications of the ACM, Feb. 2017, vol. 60, No. 2, pp. 86-95.

* cited by examiner

VISUALIZATIONS FOR LEARNED SOFTWARE INTERFACES

FIELD

The embodiments of the present disclosure generally relate to learning state transitions and generating visualizations for a software component and interface.

BACKGROUND

Software has become increasingly distributed with the rise of cloud computing and advanced system architectures. As a result, interactions among software using interfaces (e.g., application programming interfaces ("APIs") have become more significant to consistent and robust functionality. However, the pace of updates, patches, added features, and new applications generates changes to software that creates potential friction with these interactions. Accordingly, a technique to learn and communicate the behavior of software interfaces facing varying circumstances would substantially benefit the industry.

SUMMARY

The embodiments of the present disclosure are generally directed to systems and methods for learning state transitions and generating visualizations for software interfaces. Software code including a series of events can be received, where the series of events include calls to a software component and interface under test. Supplemental code can be injected into the received code. The software code with the injected supplemental code can be executed, where the executed supplemental code generates state data for the software component and interface. Based on the generated state data, a state diagram visualization can be generated that visualizes states and state transitions for the software component and interface under test given the series of events.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
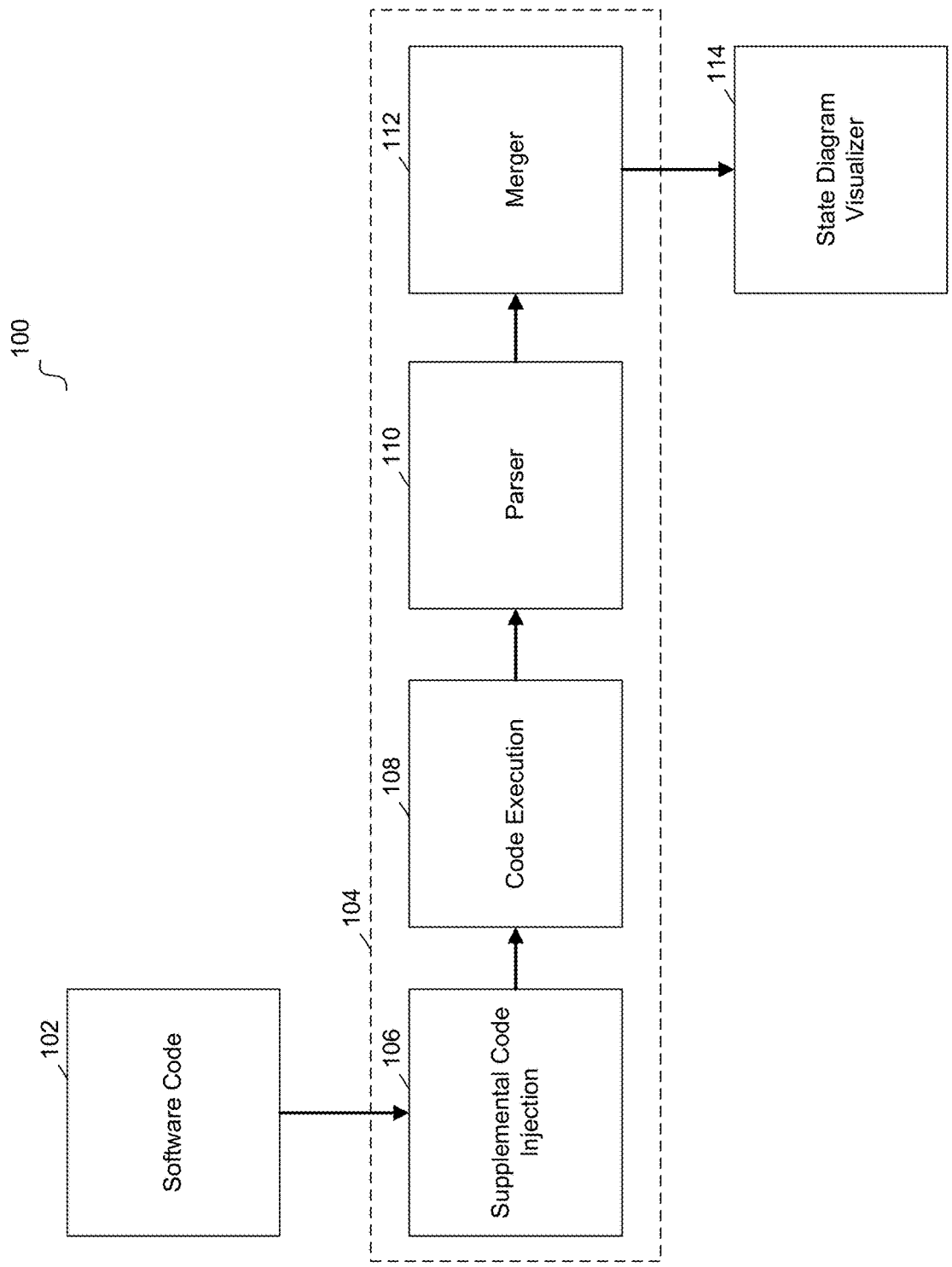
FIG. 1 illustrates a system for learning and visualizing state data for a software component and interface according to an example embodiment.

Embodiments learn and visualize a software component and interface. For example, software functionality (e.g., an application) can often be accomplished by components of software interacting via interfaces. In some embodiments, software components can be modules or chunks of code that perform specified functions. A given component can use an application programming interface ("API") to abstract the functionality accomplished by the component. For example, a mathematical software component that performs a specified math function on input passed to the component can include an API that specifies the function name/path and the expected input (e.g., number and type of parameters passed).

At times, software interfaces can become complex and/or changes to a specific software component can result in unexpected behavior when calling the specific software component's interface. This, in addition to other challenges, can result in flawed interactions between software components, failed applications/functionality, and ultimately increased downtime. In addition, changes or updates to a software component are often accompanied by testing to ensure the updated software component will integrate well with other/existing components. However, the component testing often leaves gaps in behavior and generate results that fail to comprehensively communicate the behavior of the component under test.

Embodiments learn and visualize the behavior of a software interface, and thus the underlying software component that is associated with the interface. For example, software code that includes a series of events, such as test events, can be used to learn the behavior of a software component and interface. In some embodiments, supplemental code is injected in the software code with the series of events, and this supplemental code can be configured to generate state data for the software component and interface under test. The state data learned using the supplemental code can reflect that changing state of software elements over time while executing the series of events (e.g., testing)

In some embodiments, this state data can be used to generate a state diagram visualization that visualizes states and state transitions for the software component and interface under test given the series of events. For example, the elements of software, their states, and the state transitions that are seen over time while executing the series of events (e.g., test) can be visualized by the state diagram visualization. In other words, the behavior of the software component and interface given the set of circumstances presented by the series of events can be learned and visualized by embodiments.

This visualization aids in the testing of software components and interfaces since the software component's internal behavior is visually communicated to a user or tester. In addition, the state diagram visualization can further be used to understand the software component and to setup safeguards around the software component's interactions that ensure proper functionality. Embodiments can be used to learn a comprehensive view of the behavior of software interfaces and components and interfaces to ultimately achieve a more robust system of components.

Embodiments also efficiently utilize computing resources by learning and communicating the behavior of a software component and interface at depth without the need for excessive testing. Because the internal states of software elements are learned and recorded by embodiments when executing a test, the software component and interface can be relied on at production while undergoing less testing than conventional techniques (which do not learn and communicate the internal states of the software elements). In other words, embodiments enable production ready software components for a system with less testing and using less processing power than conventional techniques.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for learning and visualizing state data for a software component and interface according to an example embodiment. System 100 includes software code 102, state learning and visualization 104, supplemental code injection 106, code execution 108, parser 110, merger 112, and state diagram visualizer 114. System 100 can learn and visualize a software component's functionality based on calls to the component's interface. For example, the interface can be an API for the software component that defines names/paths and parameters for interacting with the software component.

In some embodiments, software code 102 can be a series of events (e.g., events for a test) for the software component and interface, such as a series of API calls to instantiate attributes or objects, manipulate attributes or objects, call static methods, and the like. Software code 102 can be received by state learning and visualization 104 for processing. For example, supplemental code injection 106 can inject supplemental code into software code 102 to be executed when executing the series of events (e.g., test). In some embodiments, supplemental code can be injected at design time, at run time, or any combination of these. Embodiments of supplemental code injection 106 implement aspect-oriented programming techniques to accomplish the code injection.

In some embodiments, software code 102 with the injected supplemental code can then be executed by code execution 108. The injected supplemental code can be configured to learn the state of software elements created and/or manipulated when executing software code 102. For example, the execution of software code 102 includes calls to the interface of the software component, and the learned state of software elements (e.g., attributes, objects, static method interactions, and the like) can represent the state of software elements created or manipulated when executing these interface calls. In some embodiments, when executed the supplemental code can generate state data representative of the states of the software elements (e.g., different states over time) created and/or manipulated when executing software code 102.

In some embodiments, parser 110 can parse the state data generated by the supplemental code to generate state transitions for the software elements. For example, the state data of the software elements recorded over time (e.g., over execution of the software code 102) can be parsed to learn the state transitions of the software elements that occur. In some embodiments, supplemental code injection 106 and parser 110 are configured to learn a Mealy machine (e.g., finite-state machine) for the software component and interface under test given the series of events from software code 102.

In some embodiments, software code 102 can include two or more sets of events (e.g., two or more tests) for testing the software component and interface. For example, software component testing often includes a number of unit tests designed to ensure expected behavior. In some embodiments, the execution of each set of events (e.g., each test) generates its own state data, which can then be parsed by parser 110. In some embodiments, when multiple sets of events (e.g., multiple tests) are included in software code 102, the parsed state data for each set can be merged by merger 112. For example, the merged state data can represent global state data for the software component and its interface over the entirety of the sets of events (e.g., tests) included in software code 102.

In some embodiments, the merged state data can then be used by state diagram visualizer 114 to generate a visual state diagram that depicts the state of the software elements (e.g., software elements relevant to each set of events, or test) and their transitions. For example, the state diagram visualization can be used to visually communicate the behavior of the software component and its interface given the series of events for each set of events (e.g., test) contained within software code 102. In some embodiments, the visualized state diagram is a learned Mealy machine.

In some embodiments, software code 102 may only include a single set of events (e.g., single test). In this example, parsed state data from parser 110 can be used by state diagram visualizer 114 (without merging by merger 112) to generate a visual state diagram. In some embodiments, software code 102 may include multiple sets of events (e.g., multiple tests), but merging of the state data for the sets of events may not be performed. In this example, parsed state data from parser 110 can be used by state diagram visualizer 114 (without merging by merger 112) to generate multiple visual state diagrams.

In some embodiments, software code 102 may include multiple sets of events (e.g., multiple tests), and merging of the state data may only be performed for a subset of the sets of events (e.g., parsed state data for a subset of tests are merged while parsed state data for one or more tests are not merged). In this example, parsed state data from parser 110 can be used by state diagram visualizer 114 (without merging by merger 112) to generate one or more visual state diagrams (e.g., each representative of the state data for individual sets of events, or tests) and merged state data from merger 112 can also be used by state diagram visualizer 114 to generate a visual state diagram (e.g., representative of the merged state data).

Figure 2:
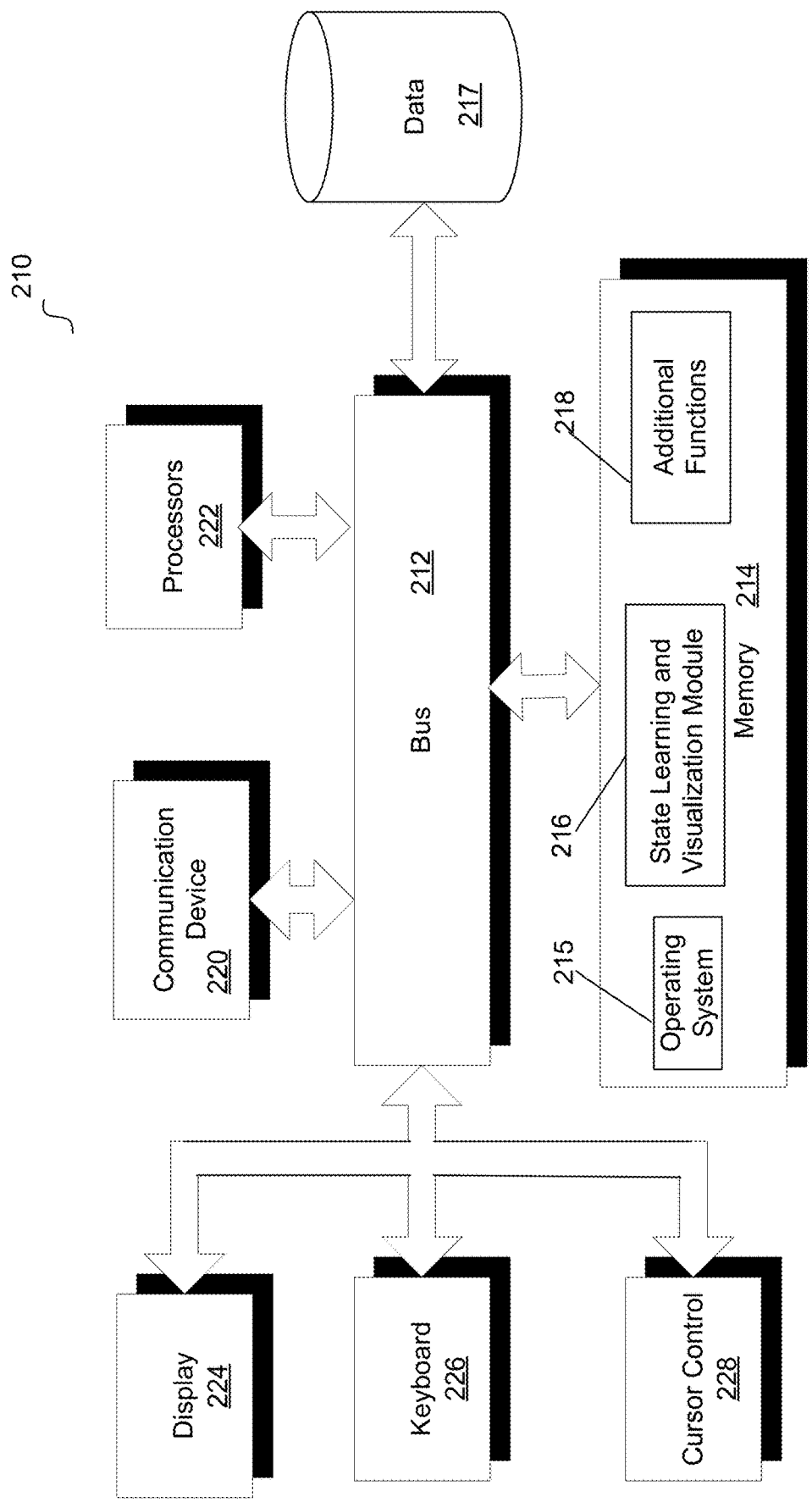
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, state learning and visualization module 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, state learning and visualization module 216, as well as other applications modules 218. Operating system 215 provides operating system functionality for system 210. State learning and visualization module 216 may provide system functionality for learning and visualizing state data for a software component under test, or may further provide any other functionality of this disclosure. In some instances, state learning and visualization module 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of the Oracle® Cloud Infrastructure ("OCI"), Oracle Application Express ("APEX"), or Oracle Visual Builder ("VB"), for example. A database 217 is coupled to bus 212 to provide centralized storage for modules 216 and 218 and to store, for example, learned state data, merged state data, configuration files, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Returning to FIG. 1, system 100 can learn and visualize a software component's functionality based on calls to the component's interface. For example, the interface can be an API for the software component that defines names/paths and parameters for interacting with the software component. In some embodiments, software code 102 can be a series of events (e.g., events for a test) for the software component and interface, such as a series of API calls to instantiate objects (and/or define attributes for the objects), manipulate attributes or objects, call static methods, and the like.

In some embodiments, the software component and interface under test can include a class (or other similar) programming structure, and the series of events of software code 102 can include calls to objects and/or methods of the class. For example, the series of events of software code 102 can instantiate and/or manipulate attributes, objects, methods, or other suitable programming structures. Below is simplified example of a series of events (e.g., test) for a stack software element and interface:

```
public void test5( ) {
    Stack<Integer> stack = new Stack<Integer>( );
    stack.push(5);
    stack.push(6);
    stack.peek( );
```

```
        stack.pop( );
        stack.pop( );
        stack.isEmpty( );
    }
```

This example includes an instantiated stack programming structure and calls to manipulate the programming structure (e.g., stack.push( ) and stack.pop( )). In the example, stack.push( ) is called to add elements '5' and '6' to the stack. Also, in the example, stack.peek( ) is called to reveal a status of the stack programming structure (e.g., 'peek' the top element of the stack). Next, stack.pop( ) is called to remove the previously added elements '5' and '6' from the stack programming structure. And finally, stack.isEmpty( ) is called to detect whether the stack programming structure is empty.

As this example series of events illustrates, the stack programming structure over the duration of the executed events (e.g., test) has a changing state. For example, the calls to the interface under test (e.g., stack.push( ) and stack.pop( )) cause state transitions for the instantiated stack programming structure. These states include creation of empty stack (instantiation), holding element '5' (stack.push(5)), holding elements '5' and '6' (stack.push(6)), and removal of elements '6' and '5' (stack.pop( ), and stack.pop( )).

Traditionally, a stack programming structure implements a "push" by adding elements sequentially (where the "top" of the stack is the latest item added), and implements a "pop" by removing (or popping) the top (or latest item added) from the stack. In other words, in the example sequence of events, the first stack.pop( ) call should remove the data element '6' from the stack (rather than the '5', which should be the second element or bottom element of the stack). The simplified example series of events can test this functionality.

In some embodiments, supplemental code injection 106 injects supplemental code into software code 102 that is configured to learn and record the state data of the software elements created or manipulated when executing software code 102 (e.g., the stack programming structure in the above example). For example, supplemental code can be selectively injected at points where software code 102 makes calls to the interface of the software component under test (e.g., when the stack programming structure is created, manipulated, or viewed, such as when the new stack is created and at stack.push( ), stack.peek( ), stack.pop( ) and stack.isEmpty( )).

In some embodiments, the supplemental code injection 106 is accomplished using Aspect-Oriented Programming ("AOP"), which is a programming paradigm to systematically manage concerns that cross-cut software. For example, one or more join points, pointcuts, advices, aspects, and the like can be designed for the interface of the software component under test (e.g., can be triggered based on method call, method execution, method return, and the like) such that the state of the software element being created, modified, or viewed is learned and recorded by the supplemental code.

In some embodiments, supplemental code injection 106 includes components of AspectJ. AspectJ is a technology that supports AOP for the Java programming language. For example, AspectJ can be configured to weave code (e.g., binary code) into a given binary. Embodiments implement AspectJ such that the supplemental code injection can be enabled/disabled readily, without changing the source code.

In some embodiments, supplemental code injection 106 uses AspectJ to obtain state data about the software component and interface under test (without changing the binary of the component). For example, supplemental code injection 106 can automatically inject aspects (e.g., pointcuts) into software code 102 with the series of events (e.g., tests or sample programs of the component). After supplemental code injection, when the series of events within software code 102 (e.g., tests) are run the supplemental code automatically collects data about the state of the component and interface under test.

In particular, embodiments of supplemental code injection 106 inject pointcuts that monitor a variety of events, such as the creation of objects, method calls, and runtime exceptions. Embodiments also include configuration options that can be used to define the classes and attributes (of the software component and interface under test) that are monitored by the injected supplemental code/pointcuts. Embodiments implements aspects that leverage Java's reflection capabilities to obtain the relevant state data. Supplemental code injection 106 can weave these aspects into software code 102 with the series of events (e.g., test programs) only in some embodiments, and not into the underlying code of the component under test. The sample code below is an example of a pointcut that monitors/traces non-static methods calls:

```
/**
 * This pointcut traces all non-static method calls.
 */
pointcut methodCalls( ) : call (!static * *.*(..))
/**
 * Take a snapshot of the state of all objects before the call event.
 */
before( ) : methodCalls( ) {
    if(target object not tracked)
    {
        // track the target object
        trackObj(thisJoinPoint.getTarget( ));
        // generate a logical name for the target object
        genObjName(thisJoinPoint.getTarget( ));
    }
    recordSystemStateBeforeAction(thisJoinPoint);
}
/**
 * Take a snapshot of the state after the call event.
 */
after( ) returning (Object returnValue) : methodCalls( ) {
    if (the returnValue not tracked) {
        // track the newly created object
        trackObj(returnValue);
        //generate a logical name for the object
        genObjName(returnValue);
    }
    recordSystemStateAfterAction(thisJoinPoint);
}
```

The sample code below is an example of a pointcut that monitors/traces objection creation:

```
/**
 * This pointcut monitors object creation event.
 */
pointcut constructorsCalls( ): call (new(..));
/**
 * Take a snapshot of the state of all objects before the constructor call event.
 */
```

-continued

```
before( ): constructorsCalls( ) {
    recordSystemStateBeforeAction(thisJoinPoint);
}
/**
 * Take a snapshot of the state of all objects after the constructor call
   event.
 */
after( ) returning (Object returnValue): constructorsCalls( ) {
    // track the newly created object
    trackObj(returnValue);
    // generate a logical name for the object
    genObjName(returnValue);
    recordSystemStateAfterAction(thisJoinPoint, returnValue);
}
```

Embodiments can implement any other suitable supplemental code configured to monitor, trace, and/or record state information from executing code. For example, embodiments can implement Java Monitoring Interfaces ("JVMPI"), or any other suitable monitoring/tracing utility.

In some embodiments, code execution 108 can execute the software code 102 with the injected supplemental code. For example, when executed the supplemental code (e.g., injected aspects or pointcuts) can generate state data representative of the states of the software elements (e.g., different states over time) created, manipulated, and/or viewed when executing software code 102. With reference to the above stack programming structure example of software code 102, the state of the stack over execution of the software can be learned and recorded by the executed supplemental code.

In some embodiments, parser 110 can parse the state data generated by the supplemental code to distinguish states and state transitions for the software elements. For example, the state data of the software elements recorded over time (e.g., over execution of the software code 102) can be parsed to learn the different states and state transitions of the software elements that occur. Embodiments of the supplemental code, when executed, can learn and record the following example information about the software component and interface under test:

From State: <state of all objects> before the method was invoked.
To State: <state of all objects> after the method was invoked.
Method Name: name of the method invoked by the test
Input Parameters: Input data to the method (if any)
Return Values: Output data returned by the method (if any)

In some embodiments, parser 110 receives this information (e.g., a log file generated by the executing supplemental code) as input and generates a configuration for a Mealy machine as output. Embodiments of parser 110 can be configured to produce different views of the output Mealy machine. For example, in a first configuration, each state can be given a unique state number based on the value of the "From State" attribute (from the log file). In some embodiments, if the method call resulted in a change of state, a new state number can be generated because the "To State" attribute (from the log file) will have a different value. For example, when the learned behavior of the software element (e.g., object) is viewed from the perspective of a directed graph, the value at each node of the graph can be assessed (e.g., value of the attributes of the object), and a new state can be distinguished for each new or distinct value. For visualization purposes, the parser can be configured to generate files that suppress the input or return values as part of the visualized Mealy machine.

In some embodiments, parser 110 and/or the supplemental code generates logical names for the software elements (e.g., instantiated objects). For example, a logical name mapping can be generated for each runtime memory location created when executing software code 102 of FIG. 1.

In some embodiments, parser 110 generates a DOT configuration file (e.g., file for representing directed graphs) that is used to visualize the Mealy machine. Some embodiments may also represent the Mealy machine as extensible markup language ("XML") or other equivalent formats (for interoperability with visualization tools). Below is a sample Mealy machine generated by parser 110 in the DOT format.

```
digraph MealyMachine {
    0[tooltip=""]
    1[tooltip="Stack_0: Empty=true;"]
    2[tooltip="Stack_0: Empty=false;"]
    0 -> 1 [label = "<init>( )/Stack_0"]
    1 -> 2 [label = "push(5)/5"]
}
```

In this example there are three states, denoted by state names "0", "1", and "2". The initial state, "0", has no state variables, which is indicated by the tooltip attribute being an empty string. The result of creating an object (e.g., <init> call) changes the state to the new state named "1", as indicated by the state change "0->1" and corresponding label attribute. At state "1" the stack exists but is empty, which is shown as part of the tooltip attribute. The result of calling the push(5) method changes the state of the stack to the logical state named "2", as indicated by the state change "1->2" and corresponding label attribute. At state "2", the stack is not empty.

In the above example, the attributes of the stack programming structure (e.g., the elements it contains) define different states distinguished by parser 110 of FIG. 1. Embodiments include a custom abstraction that can be used by the supplemental code and/or parser 110 to distinguish states for the stack programming structure (e.g., empty or non-empty). In other words, the attributes or characteristics of a software element (e.g., object) that are used to distinguish states by embodiments can be configured.

With reference to the stack programming structure example described above, state data for the stack learned and recorded by the supplemental code (over the execution of software code 102) can be parsed by parser 110 to generate the below example parsed state data:

```
digraph MealyMachine {
    size="12.13"
    node [shape = circle , style=bold];
    "Stack_0: [5];" -> "Stack_0: [ ];" [label = "Stack_0.pop( )/5"]
    "Stack_0: [5];" -> "Stack_0: [5, 6];" [label = "Stack_0.push(6)/6"]
    "" -> "Stack_0: [ ];" [label = "<init>( )/Stack_0"]
    "Stack_0: [ ];" -> "Stack_0: [5];" [label = "Stack_0.push(5)/5"]
    "Stack_0: [ ];" -> "Stack_0: [ ];" [label = "Stack_0.isEmpty( )/true"]
    "Stack_0: [5, 6];" -> "Stack_0: [5];" [label = "Stack_0.pop( )/6"]
    "Stack_0: [5, 6];" -> "Stack_0: [5, 6];" [label = "Stack_0.peek( )/6"]
}
```

In some embodiments, the parsed state data can be a DOT file that formats the states and state transitions as a graph or directed graph. Any other suitable format or configuration can similarly be implemented. The above example includes one series of events related to the stack programming structure (e.g., one test) within software code 102. In this example, merger 112 is not used to merge different parsed state data (other examples are implemented with merger 112).

In some embodiments, state diagram visualizer 114 generates a visual state diagram of the learned states and state transitions for the stack programming structure given the series of events (e.g., test functionality) of software code 102. State diagram visualizer 114 can include components of third-party or open source software, such as Dotty, Graphviz, and any other suitable components.

Figure 3:
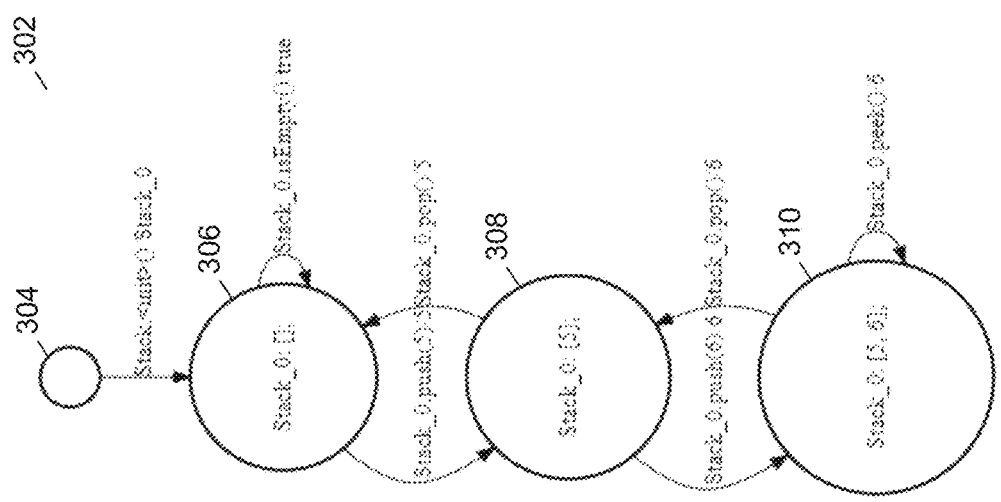
FIG. 3 illustrates a state diagram for a learned software component and interface of a stack programming structure according to an example embodiment.

FIG. 3 illustrates a state diagram for a learned software component and interface of a stack programming structure according to an example embodiment. For example, diagram 302 visually illustrates the state and state transitions of the stack programming structure over the execution of the above example of software code 102. The illustrated embodiment depicts four states 304, 306, 308, and 310 for the stack programming structure and also depicts transitions among the states. For example, the transitions among the depicted states are caused by calls to (or execution of) the interface for the software component under test (e.g., stack.push( ), stack.peek( ), stack.pop( ) and stack.isEmpty( )).

State 304 represents the initial empty state. The transition from state 304 is stack.<init>( ) which instantiates the stack object and transitions to state 306. State 306 represents the creation of the stack and visually depicts the stack as empty. Transitions from state 306 include stack.isEmpty( ), which outputs true since the stack is empty and remains at state 306, and stack.push(5), which adds the element '5' to the stack and transitions to state 308. State 308 represents the stack with a single element '5'. Transitions from state 308 include stack.push(6), which adds element '6' to the stack and transitions to state 310, and stack.pop( ) which removes the top element from the stack (e.g., element '5') and transitions to state 306.

State 310 represents the stack with element '6' (the top element) and element '5'. Transitions from state 310 include stack.peek( ), which remains at state 310 and outputs the value '6' (reflective of the top element of the stack), and stack.pop( ) which removes the top element from the stack (e.g., element '6') and transitions to state 308. Accordingly, the state and state transitions depicted in diagram 302 reflect the state of the stack instantiated and manipulated by the example series of events (e.g., test) that are performed over the execution of software code 102 (including the injected supplemental code).

Diagram 302 confirms the stack behavior of the software component and interface under test. In particular, traditionally a stack programming structure implements a "push" by adding elements sequentially (where the "top" of the stack is the latest item added), and implements a "pop" by removing (or popping) the top (or latest item added) from the stack. Diagram 302 confirms that the element '5' and element '6' are sequentially added by the stack.push( ) calls, that the stack.peek( ) call returns the correct element '6' atop the stack, and that the stack.pop( ) calls first remove the correct element '6' and second remove the correct element '5'. In other words, diagram 302 visually demonstrates that the software component under test implements the expected behavior of a stack programming structure given the example series of events (e.g., test).

Embodiments of the software component and interface under test implement functionality for one or more software elements via a programming interface. In the above example, the software component under test implements a stack programming structure and provides an interface for the software element (e.g., a constructor, the method calls stack.push( ), stack.pop( ), and the like).

In some embodiments, the software component under test, such as a first class, can incorporate another software component, such as an encapsulated object of a second class. For example, the below software component includes a class A that includes an encapsulated object of class B:

```
public class A {
  B b;
  public A( )
  {
    b = new B(this);
    D.initialize( );
  }
  public String getString( )
  {
    C cobj = b.getC( );
    return cobj.getData( );
  }
  public String getJunkData( )
  {
    return D.getData( );
  }
  public B getB( )
  {
    return b;
  }
}
public class B {
  C c;
  public B(A a)
  {
    c = new C(a);
  }
  public C getC( )
  {
    return c;
  }
}
```

In some embodiments, such a software component that includes encapsulated elements of other software components can also be processed to generate a visual state diagram. For example, software code with the series of steps (e.g., test) for such a software component can include:

```
public class ATest {
  @Test
  public void test( ) {
    new A( ).getB( ).getC( );
  }
}
```

Figure 4:
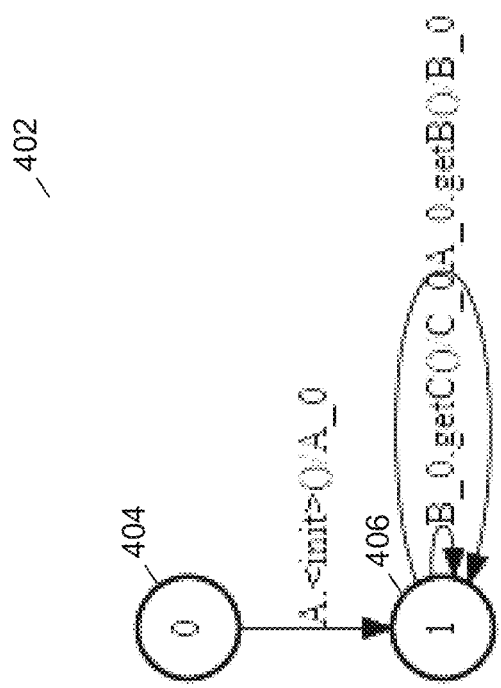
FIG. 4 illustrates a state diagram for a learned software component and interface with an encapsulation according to an example embodiment.

Referring back to FIG. 1, software code 102 can include the above series of events to test the software component with the encapsulation, and this code can be injected with supplemental code (by supplemental code injection 106), executed (by code execution 108), and parsed (by parser 110) to generate parsed state data for the software component under test given the series of events. In some embodiments, state diagram visualizer 114 can then generate the state diagram that depicts the relevant states and state transitions. FIG. 4 illustrates a state diagram for a learned software component and interface with an encapsulation according to an example embodiment.

For example, diagram 402 visually illustrates the state and state transitions of the software component and interface over the execution of the above example of software code 102. The illustrated embodiment depicts two states 404 and 406 and also depicts state transitions. State 404 represents the initial empty state. The transition from state 404 is A.<init>( ) which instantiates object A and transitions to state 406. In the series of events (e.g., test), a call to getB( ) is made using the instantiated object A, which in turn is used to call getC(). The getB( ) and get( )C calls are illustrated as transitions in diagram 402, though both transitions are from state 406 to state 406 in the illustrated embodiment.

This example illustrates that, in some embodiments, calls made using a software component under test (e.g., class A) based on an encapsulated software component (e.g., class B) are learned and depicted in the generated state diagram visualization. In other words, the functionality and behavior of the encapsulated software component (e.g., class B) are also learned and visualized by embodiments given the series of events (e.g., test).

In some embodiments, software code 102 of FIG. 1 can include multiple sets of events (e.g., multiple tests). For example, multiple sets of events for a software component related to account management (e.g., bank account) can be as follows:

```
public class AcctTest {
    @Test
    public void test( ) {
        int acctNum = 1234;
        Account act = new Account(acctNum);
        // Deposit $100
        act.deposit(100);
        // Withdraw $100
        act.withdraw(100);
    }
    @Test
    public void test2( ) {
        int acctNum = 1234;
        Account act = new Account(acctNum);
        // Deposit $100
        act.deposit(100);
        // Withdraw $50
        act.withdraw(50);
    }
    @Test
    public void test3( ) {
        int acctNum = 1234;
        Account act = new Account(acctNum);
        // Deposit $100
        act.deposit(100);
        // Withdraw $200
        act.withdraw(200);
    }
}
```

The above demonstrates the instantiation of three account objects (e.g., one for each of the three tests). Each series of events manipulates the corresponding account object (e.g., using interface calls act.deposit( ) and act.withdraw( )), such that the state of the account object is changed. Referring back to FIG. 1, software code 102 can include the above sets of events to test the software component for account management, and this code can be injected with supplemental code (by supplemental code injection 106), executed (by code execution 108), and parsed (by parser 110) to generate parsed state data for the software component under test given the sets of events.

Figure 5A:
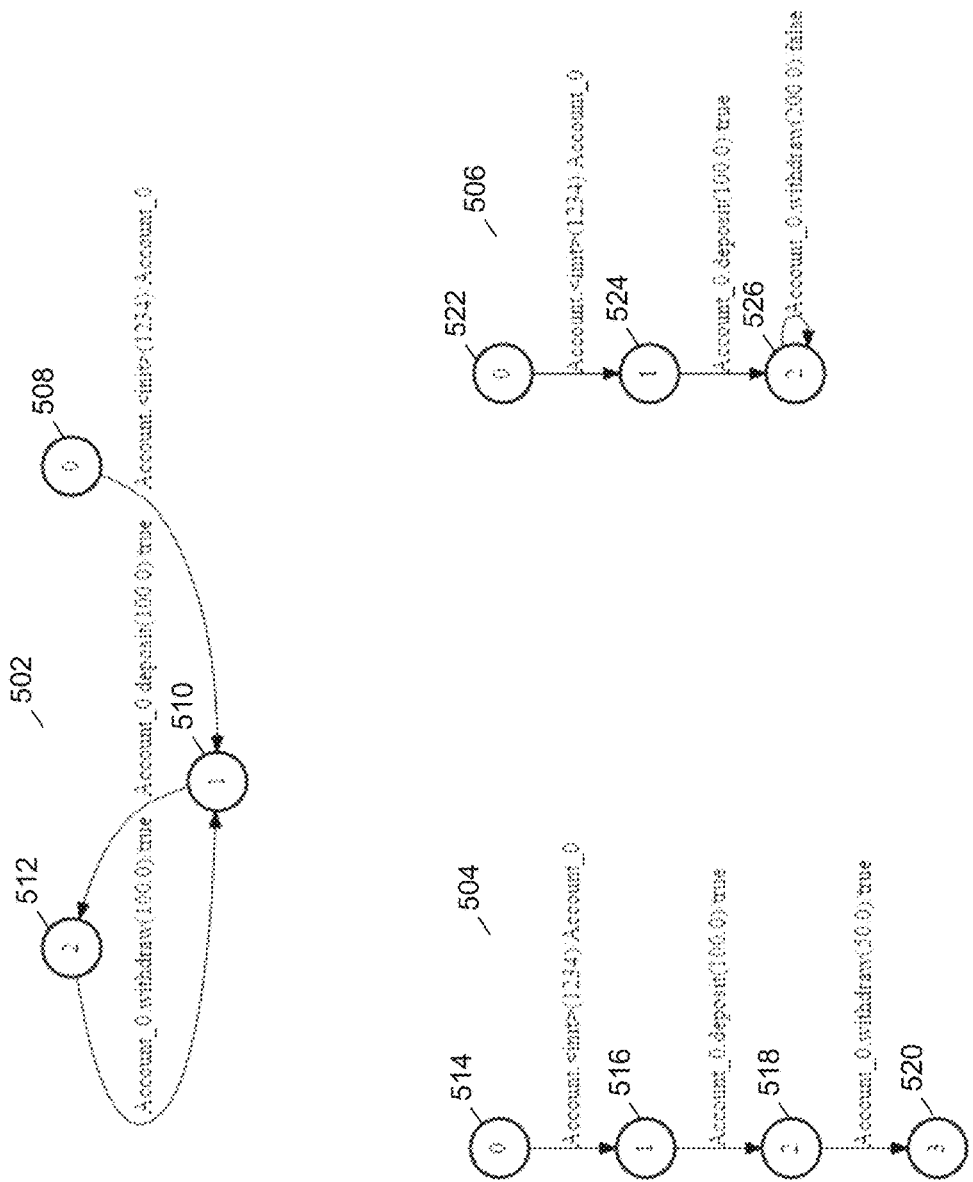
FIGS. 5A and 5B illustrate state diagrams for a learned software component and interface for account management according to an example embodiment.
Figure 5B:
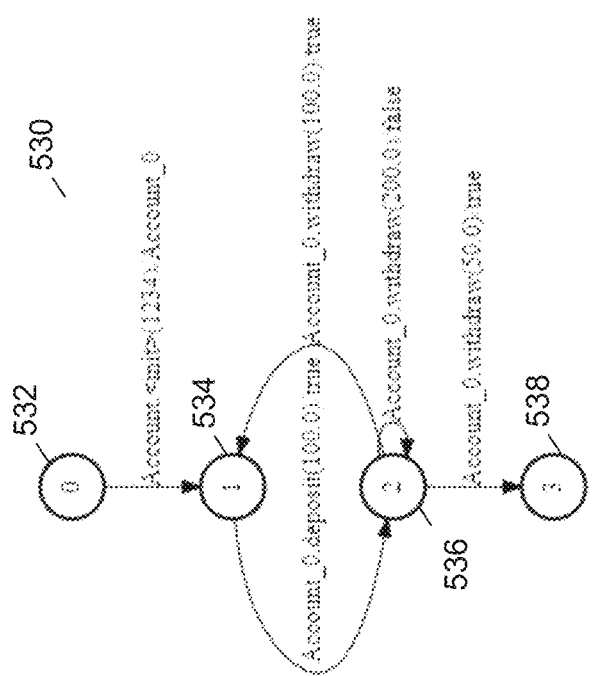

In some embodiments, each of the three sets of events (e.g., tests) results in separate parsed state data. State diagram visualizer 114 can generate state diagrams that depict the relevant states and state transitions for the separate parsed state data. FIGS. 5A and 5B illustrate state diagrams for a learned software component and interface for account management according to an example embodiment. FIG. 5A illustrates diagrams 502, 504, and 506, which depict the states and state transitions for the account object instantiated in each of the three sets of events. For example, diagram 502 reflects states 508, 510, and 512 as well as state transitions based on the events of example test 1, diagram 504 reflects states 514, 516, 518, and 520, as well as state transitions based on the events of example test 2, and diagram 506 reflects states 522, 524, and 526, as well as state transitions based on the events of example test 3.

In some embodiments, merger 112 can merge the parsed state data for each of the three sets of events to create global state data that encompasses the account object states and state transitions for all three sets (e.g., all three tests). For example, the global state data can be:

```
digraph MealyMachine {
    size="12.13"
    node [shape = circle , style=bold];
    0[tooltip=""]
    2[tooltip="Account_0: [accountBalance=100.0, accountNumber=1234];"]
    3[tooltip="Account_0: [accountBalance=50.0, accountNumber=1234];"]
    1[tooltip="Account_0: [accountBalance=0.0, accountNumber=1234];"]
        0 -> 1 [label = "Account.<init>(1234)/Account_0"]
        2 -> 1 [label = "Account_0.withdraw(100.0)/true"]
        2 -> 3 [label = "Account_0.withdraw(50.0)/true"]
        2 -> 2 [label = "Account_0.withdraw(200.0)/false"]
        1 -> 2 [label = "Account_0.deposit(100.0)/true"]
}
```

In some embodiments, state diagram visualizer 114 can then generate a state diagram that depicts the relevant states and state transitions for the global state data. FIG. 5B illustrates diagram 530, which depicts states and state transitions for the account objects instantiated in all of the three sets of events (e.g., three tests). In other words, the behavior of each account object in the different sets of events is learned and merged to generate a visualization that communicates the behaviors of the account objects in a single diagram. For example, diagram 530 reflects states 532, 534, 536, and 538, as well as state transitions based on the events of example tests 1, 2, and 3. By merging the parsed state data for the three separate sets of events (e.g., three tests) the states and state transitions depicted in diagrams 502, 504, and 506 of FIG. 5A are collapsed into the single diagram 530 of FIG. 5B.

Embodiments can be configured to generate different types of state diagram visualizations. For example, the state diagram visualizations can be Mealy machine visualizations of a variety of types: (Type 1) One Mealy machine per test case; (Type 2) One Mealy machine per object; and (Type 3) One Mealy machine for all test cases. For Type 1 visualizations, there is a correspondence of one log file (e.g., generated by the executed supplemental code injected into the software code 102 of FIG. 1) per test case. If there are 10 test case, there will be 10 Mealy machine visualizations. In other words, embodiments configured to generate Type 1 visualizations do not merge state data (e.g., from different log files).

For Type 2 visualizations, each object (or static method) has its own log file of state data in some embodiments. For example, if a test case has two objects, then two Mealy machines visualizations corresponding to these objects can be generated. In addition, embodiments of Type 2 visualizations also generate a merged Mealy machine visualization for all objects using their state data. In some embodiments, if different objects have the same state then they have the same state name on the merged visualization. For Type 3 visualizations, embodiments generate a single log file that contains the state data for all objects on all tests. Thus, the state name generation logic applicable to Type 2 visualizations can be used to generate the Type 3 visualizations.

In some embodiments, the executed supplemental code (e.g., injected aspects or pointcuts) that learns the software component and interface under test (based on the series of events, or test, within software code 102 of FIG. 1) generates different log files using the same format. For example, a merged log file can contain the state data of all objects and all test cases, and the parser can convert the merged log file into parsed state date (e.g., for a single Mealy machine visualization) as if all the state data were produced by one test case. As an explanatory example, consider the following two samples.

```
public void test( ) {
Stack<Integer> stack = new Stack<Integer>( );
stack.push(5);
stack.contains(5);
stack.pop( );
stack.contains(5);
}
public void test2( ) {
Stack<Integer> stack = new Stack<Integer>( );
stack.push(5);
stack.peek( );
stack.pop( );
stack.push(6);
stack.pop( );
stack.isEmpty( );
}
```

Given the above series of events (e.g., executed test), embodiments of the executed supplemental code generate one state even though the stack has item 5 for both test cases. In this embodiment, another state is then generated when test case 2 pushes item 6. Example merged state data for the merged Mealy machine visualization, shown below, demonstrates that only three states (0, 1, 2) are needed for these two test cases (at least because they share one common state).

```
digraph MealyMachine {
    0[tooltip=""]
    1[tooltip="Stack_0: Empty=true;"]
    2[tooltip="Stack_0: Empty=false;"]
    1 -> 1 [label = "contains(5)/false"]
    1 -> 1 [label = "isEmpty( )/true"]
    1 -> 2 [label = "push(5)/5"]
    1 -> 2 [label = "push(6)/6"]
    0 -> 1 [label = "<init>( )/Stack_0"]
    2 -> 1 [label = "pop( )/5"]
    2 -> 2 [label = "peek( )/5"]
    2 -> 1 [label = "pop( )/6"]
    2 -> 2 [label = "contains(5)/true"]
}
```

In some embodiments, the manner in which the state data is learned and parsed into state and state transition data can be configured (e.g., based on optional parameters). For example, consider a software component and interface that accomplishes functionality for a stack programming structure. Referring to FIG. 1, software code 102 with a set of events (e.g., test) for this software component can include:

```
@Test
    public void test( ) {
        Stack<Integer> stack = new Stack<Integer>( );
        stack.push(5);
        stack.contains(5);
        stack.pop( );
        stack.contains(5);
    }
```

In some embodiments, the supplemental code injection and/or parser can be configured to learn and parse the state data using a parameter modcount. The modcount parameter can be used to configure the detection of a state. Referring again to FIG. 1, the modcount parameter can be set and software code 102 with the above series of events to test the software component with the stack functionality can be injected with supplemental code (by supplemental code injection 106), executed (by code execution 108), and parsed (by parser 110) to generate parsed state data.

Embodiments learn the status of the instantiated stack as the series of events is executed, however when the modcount parameter is enabled, a count of modifications to the instantiated stack is also tracked, learned, and recorded. For example, because modifications to the stack are tracked, when modcount is enabled the parsed data can be:

```
digraph MealyMachine {
    size="12.13"
    node [shape = circle , style=bold];
    1[tooltip="Stack_0: [serialVersionUID=1224463164541339165,
    MAX_ARRAY_SIZE=2147483639, capacityIncrement=0, elementCount=0,
    elementData={<null>,<null>,<null>,<null>,<null>,<null>,<null>,<null>,<null>,<
    null>}, serialVersionUID=-2767605614048989439, modCount=0,
    MAX_ARRAY_SIZE=2147483639];"]
    3[tooltip="Stack_0: [serialVersionUID=1224463164541339165,
    MAX_ARRAY_SIZE=2147483639, capacityIncrement=0, elementCount=0,
    elementData={<null>,<null>,<null>,<null>,<null>,<null>,<null>,<null>,<null>,<
    null>}, serialVersionUID=-2767605614048989439, modCount=2,
    MAX_ARRAY_SIZE=2147483639];"]
    2[tooltip="Stack_0: [serialVersionUID=1224463164541339165,
    MAX_ARRAY_SIZE=2147483639, capacityIncrement=0, elementCount=1,
    elementData={5,<null>,<null>,<null>,<null>,<null>,<null>,<null>,<null>}
    , serialVersionUID=-2767605614048989439, modCount=1,
    MAX_ARRAY_SIZE=2147483639];"]
    0[tooltip=""]
        1 -> 2 [label = "Stack_0.push(5)/5"]
        3 -> 3 [label = "Stack_0.contains(5)/false"]
        2 -> 2 [label = "Stack_0.contains(5)/true"]
```

-continued
```
2 -> 3 [label = "Stack_0.pop( )/5"]
0 -> 1 [label = "Stack.<init>( )/Stack_0"]
}
```

In this example, four states are reflected in the above parsed data, with transitions among them. On the other hand, when modcount is not enabled the modification count is not tracked, and the parsed data can be:

```
digraph MealyMachine {
  size="12.13"
  node [shape = circle , style=bold];
0[tooltip=""]
1[tooltip="Stack_0: [serialVersionUID=1224463164541339165,
MAX_ARRAY_SIZE=2147483639, capacityIncrement=0, elementCount=0,
elementData={<null>,<null>,<null>,<null>,<null>,<null>,<null>,<null>,<null>,<
null>}, serialVersionUID=-2767605614048989439,
MAX_ARRAY_SIZE=2147483639];"]
2[tooltip="Stack_0: [serialVersionUID=1224463164541339165,
MAX_ARRAY_SIZE=2147483639, capacityIncrement=0, elementCount=1,
elementData={5,<null>,<null>,<null>,<null>,<null>,<null>,<null>,<null>,<null>}
, serialVersionUID=-2767605614048989439,
MAX_ARRAY_SIZE=2147483639];"]
  0 -> 1 [label = "Stack.<init>( )/Stack_0"]
  1 -> 2 [label = "Stack_0.push(5)/5"]
  1 -> 1 [label = "Stack_0.contains(5)/false"]
  2 -> 2 [label = "Stack_0.contains(5)/true"]
  2 -> 1 [label = "Stack_0.pop( )/5"]
}
```

Figure 6:
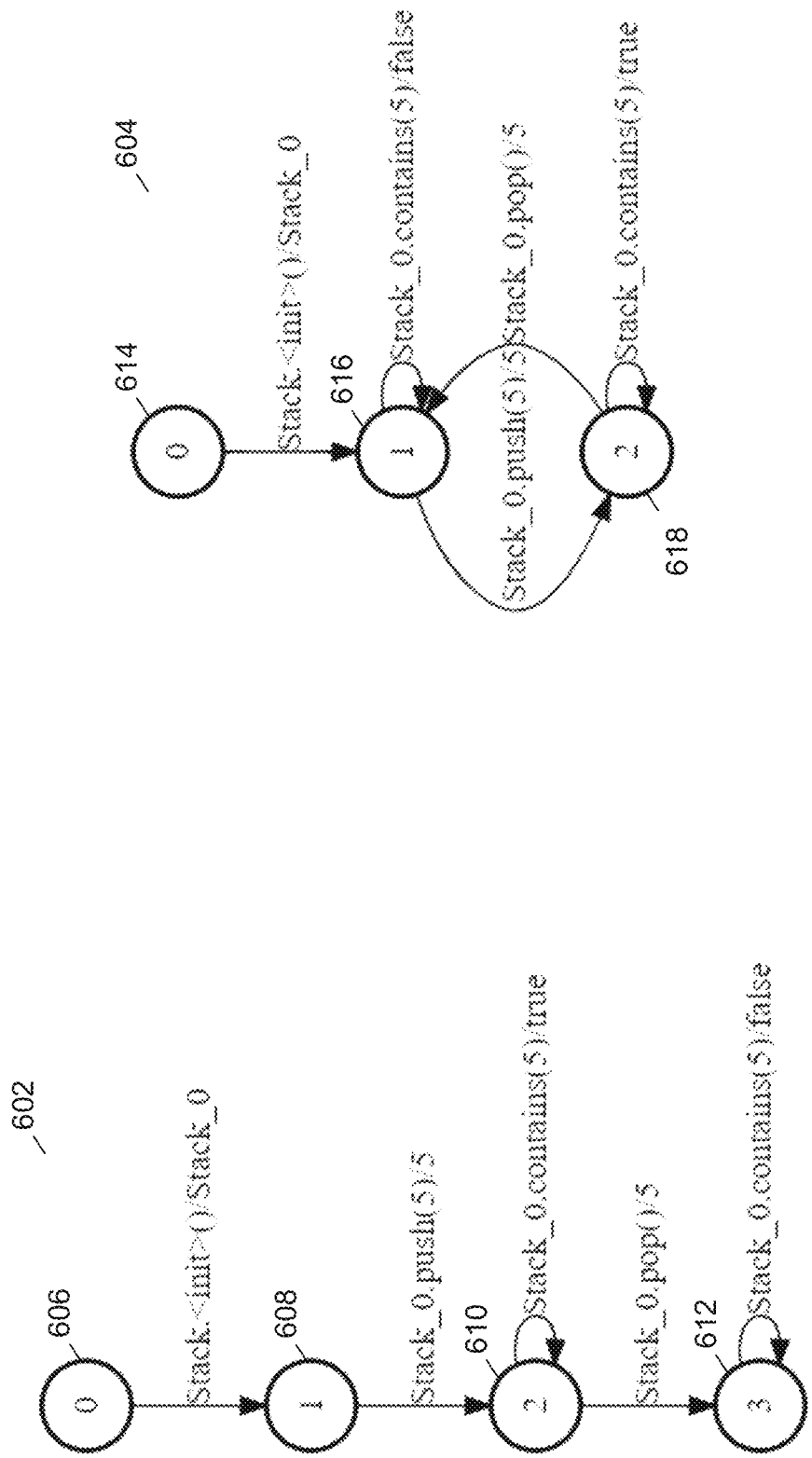
FIG. 6 illustrates state diagrams for a learned software component and interface of a stack programming structure according to an example embodiment.

In this example, three states are reflected in the above parsed data, with transitions between them. In some embodiments, state diagram visualizer 114 can generate the state diagram that depicts the relevant states and state transitions. FIG. 6 illustrates state diagrams for a learned software component and interface of a stack programming structure according to an example embodiment. Diagram 602 illustrates the states and state transitions for the stack when the modcount parameter is enabled and diagram 604 illustrates the states and state transitions for the stack when the modcount parameter is not enabled. Diagram 602 depicts four states 606, 608, 610, and 612, while diagram 604 depicts only three states 614, 616 and 618.

In particular, when modcount is enabled, the stack.pop( ) that removes the element "5" from the stack transitions from state 610 to state 612 in diagram 602. On the other hand, when modcount is not enabled, this same stack.pop( ) that removes the element "5" from the stack transitions from state 618 back to state 616 in diagram 602 (instead of transitioning to a new state). Without the tracking of modcount, the three different states are collapsed into two states since 608 and 612 from diagram 602 are both represented by state 616 in diagram 604.

In some embodiments, the software component and interface under test include a static method (rather than, or in addition to, an object), and the state and state transitions for the static method can be learned, recorded, and visualized. For example, consider a software component and interface with the below static method:

```
class StaticClass {
    private static int i = 0;
    public static void setData(int i)
    {
```

-continued
```
        StaticClass.i = i;
    }
```

```
    public static int getData( )
    {
        return i;
    }
}
```

Referring to FIG. 1, software code 102 with a set of events (e.g., test) for this software component can include:

```
    public void test( ) {
        StaticClass.getData( );
        StaticClass.setData(5);
        StaticClass.getData( );
    }
    @Test
    public void test2( ) {
        StaticClass.getData( );
        StaticClass.setData(6);
        StaticClass.getData( );
    }
```

In some embodiments, and similar to previous examples where the states of an instantiated object are learned, the states and state transitions for the above static method can be learned given the above sets of events (e.g., test1 and test2). Referring back to FIG. 1, software code 102 can include the above sets of events to test the software component with the static method, and this code can be injected with supplemental code (by supplemental code injection 106), executed (by code execution 108), and parsed (by parser 110) to generate parsed state data. Example parsed state data can be:

```
digraph MealyMachine {
    size="12.13"
    node [shape = circle, style=bold];
    1[tooltip="{class systemUnderTest.StaticClass=i=6}"]
    0[tooltip=""]
        1 -> 1 [label = "getData( )/6"]
        0 -> 1 [label = "setData(6)/null"]
        0 -> 0 [label = "getData( )/0"]
}
```

Figure 7:
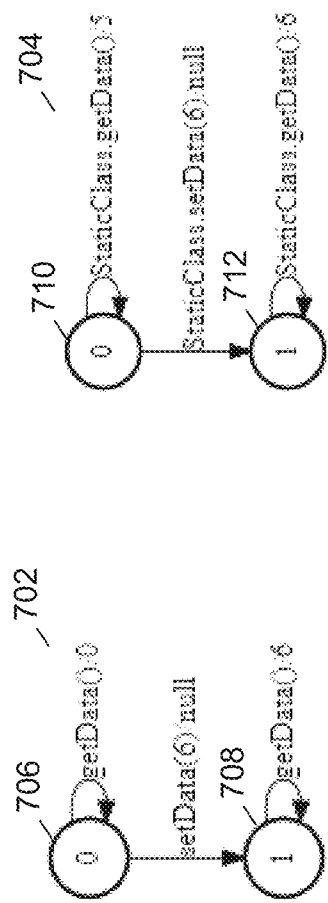
FIG. 7 illustrates a state diagram for a learned software component and interface with a static method according to an example embodiment.

In some embodiments, state diagram visualizer 114 can then generate the state diagram that depicts the relevant states and state transitions for the static method. FIG. 7 illustrates a state diagram for a learned software component and interface with a static method according to an example embodiment. For example, diagram 702 illustrates states 706 and 708 for the static method and diagram 706 illustrates states 710 and 712 for the static method.

In diagram 702, the static class state is restored while in diagram 704 the static class state is not restored. For example, executing code (e.g., a test) can alter values related to a static method (e.g., attributes, or other related values), and thus the order in which tests are run can impact performance. Embodiments restore the state of a static class (e.g., to its initial state) such that the order in which code is executed (e.g., tests are run) is not impactful on performance.

In some embodiments, the series of events (e.g., tests) for the software component and interface under test can include multiple instantiations for a software element, such as an object. For example, consider a software component and interface that accomplishes functionality for a stack pro-

```
public void test3( ) {
    Stack<Integer> stack = new Stack<Integer>( );
    Stack<Integer> stack2 = new Stack<Integer>( );
    stack.push(5);
    stack2.push(6);
    stack.peek( );
    stack2.pop( );
    stack.isEmpty( );
    stack.pop( );
}
```

In the above example series of events (e.g., test) two stack programming structures are instantiated (e.g., stack and stack2). Embodiments can learn the states of each instantiated stack. The series of events manipulates or views the two stack objects (e.g., using interface calls stack.push( ), stack.pop( ), stack.peek( ), and stack.isEmpty( )), such that the state of the stack objects is changed. Referring back to FIG. 1, software code 102 can include the above series of events to test the software component, and this code can be injected with supplemental code (by supplemental code injection 106), executed (by code execution 108), and parsed (by parser 110) to generate parsed state data for the software component under test given the sets of events.

In some embodiments, parsed state data is generated for each stack programming structure instantiated. For example, the 'stack' programming structure (given the series of events, or test) can generate the below parsed data:

```
digraph MealyMachine {
    size="12.13"
    node [shape = circle , style=bold];
    1[tooltip="[serialVersionUID=1224463164541339165,
MAX_ARRAY_SIZE=2147483639, capacityIncrement=0, elementCount=0,
elementData={<null>,<null>,<null>,<null>,<null>,<null>,<null>,<null>,<null>,<null>},
serialVersionUID=-2767605614048989439, MAX_ARRAY_SIZE=2147483639]"]
    2[tooltip="[serialVersionUID=1224463164541339165,
MAX_ARRAY_SIZE=2147483639, capacityIncrement=0, elementCount=1,
elementData={5,<null>,<null>,<null>,<null>,<null>,<null>,<null>,<null>,<null>},
serialVersionUID=-2767605614048989439, MAX_ARRAY_SIZE=2147483639]"]
    0[tooltip=""]
        1 -> 2 [label = "Stack_0.push(5)/5"]
        2 -> 1 [label = "Stack_0.pop( )/5"]
        2 -> 2 [label = "Stack_0.peek( )/5"]
        2 -> 2 [label = "Stack_0.isEmpty( )/false"]
        0 -> 1 [label = "Stack.<init>( )/Stack_0"]
}
``` gramming structure. Referring to FIG. 1, software code 102 with a set of events (e.g., test) for this software component can include:

In another example, the 'stack2' programming structure (given the series of events, or test) can generate the below parsed data:

```
digraph MealyMachine {
    size="12.13"
    node [shape = circle , style=bold];
    0[tooltip=""]
    1[tooltip="[serialVersionUID=1224463164541339165,
MAX_ARRAY_SIZE=2147483639, capacityIncrement=0, elementCount=0,
elementData={<null>,<null>,<null>,<null>,<null>,<null>,<null>,<null>,<null>,<
null>}, serialVersionUID=-2767605614048989439,
MAX_ARRAY_SIZE=2147483639]"]
    2[tooltip="[serialVersionUID=1224463164541339165,
MAX_ARRAY_SIZE=2147483639, capacityIncrement=0, elementCount=1,
elementData={6,<null>,<null>,<null>,<null>,<null>,<null>,<null>,<null>,<null>}
, serial Version UID=-2767605614048989439,
```

-continued

```
MAX_ARRAY_SIZE=2147483639]"]
    0 -> 1 [label = "Stack.<init>( )/Stack_1"]
    1 -> 2 [label = "Stack_1.push(6)/6"]
    2 -> 1 [label = "Stack_1.pop( )/6"]
}
```

Figure 8:
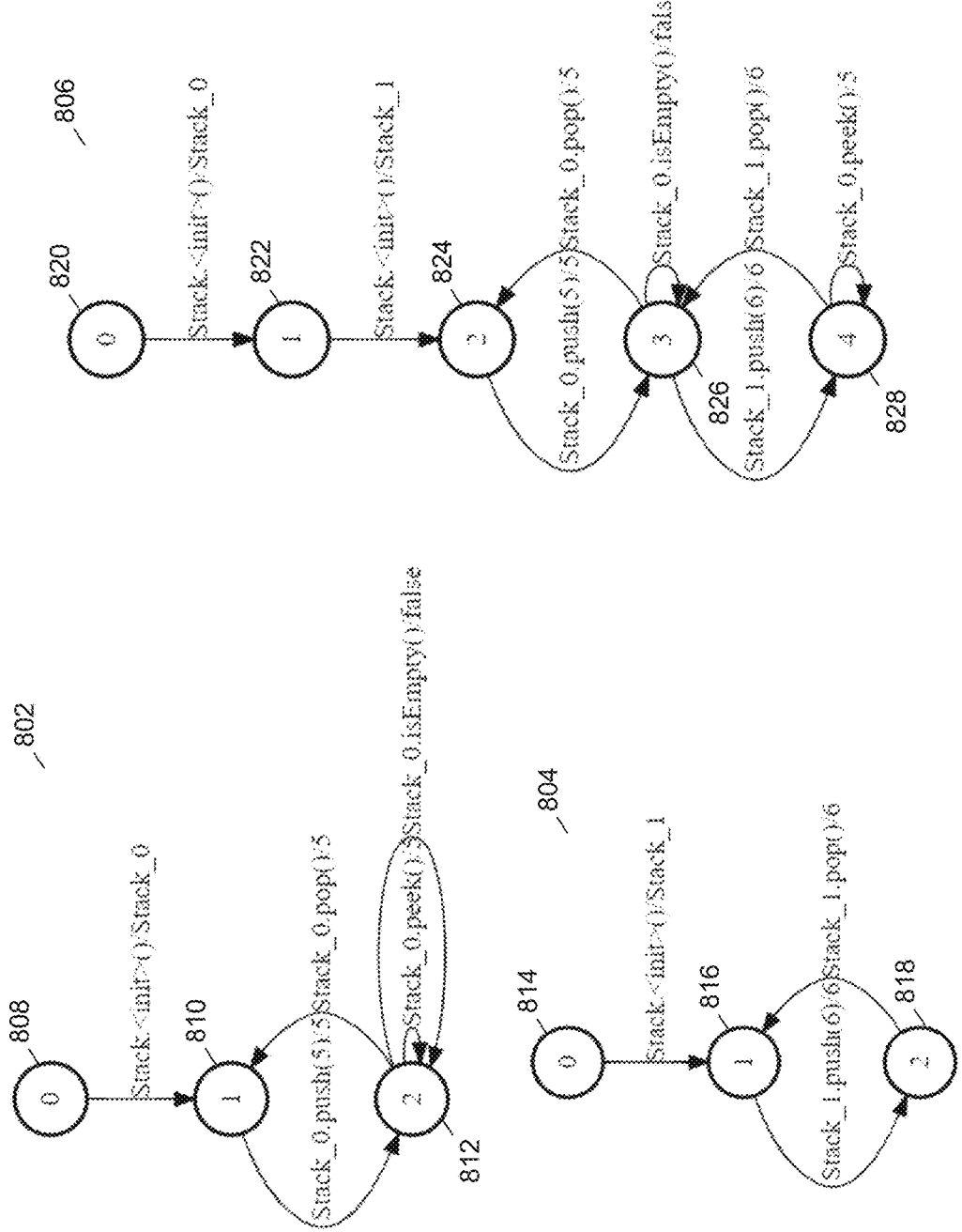
FIG. 8 illustrates state diagrams for a learned software component and interface with multiple instantiated programming structures according to an example embodiment.

In some embodiments, states and state transitions for the 'stack' and 'stack2' programming structures can be visualized separately and/or visualized together. State diagram visualizer 114 can generate state diagrams that depict the relevant states and state transitions for the separate parsed state data. FIG. 8 illustrates state diagrams for a learned software component and interface with multiple instantiated programming structures according to an example embodiment.

Diagram 802 illustrates the visual state diagram for the 'stack' programming structure (given the series of events, or test) and diagram 804 illustrates the visual state diagram for the 'stack2' programming structure (given the series of events, or test). Diagram 802 depicts states 808, 810, and 812 for the 'stack' programming structure, as well as transitions between these states (e.g., based on calls to stack.<init>( ), stack.push( ), stack.pop( ), stack.peek( ), and stack.isEmpty( )) and diagram 804 depicts states 814, 816, and 818 for the 'stack2' programming structure, as well as transitions between these states (e.g., based on calls to stack.<init>( ), stack2.push( ) and stack2.pop( )).

In some embodiments, the states and state transitions for both 'stack' and 'stack2' can be illustrated as a visual state diagram such as diagram 806. Diagram 806 depicts states 820, 822, 824, 826, and 828 for the 'stack' and 'stack2' programming structures, as well as transitions among these states (e.g., based on calls to stack.push( ), stack.pop( ), stack.peek( ), stack.isEmpty( ), stack2.push( ), and stack2.pop( )). In particular, embodiments of parser 110 of FIG. 1 can parse the state data learned about the 'stack' and 'stack2' programming structures to generate separate state data and state transitions (e.g., visualized by state diagram visualizer 114 as diagrams 802 and 804) and/or global state data and state transitions (e.g., visualized by state diagram visualizer 114 as diagram 806).

In some embodiments, the learned state information for a software component and interface under test can suppress certain aspects of information, such as object labels. For example, parser 110 of FIG. 1 can be configured to generate parsed state data that does not record the object label (e.g., object used in a method call):

```
digraph MealyMachine {
    size="12.13"
    node [style=bold];
    0[tooltip=""]
    1[tooltip="Stack_0: Empty=true;"]
    2[tooltip="Stack_0: Empty=false;"]
    0 -> 1 [label = "<init>( )/Stack_0"]
    1 -> 1 [label = "contains(5)/false"]
    1 -> 2 [label = "push(5)/5"]
    2 -> 1 [label = "pop( )/5"]
    2 -> 2 [label = "contains(5)/true"]
}
```

Figure 9:
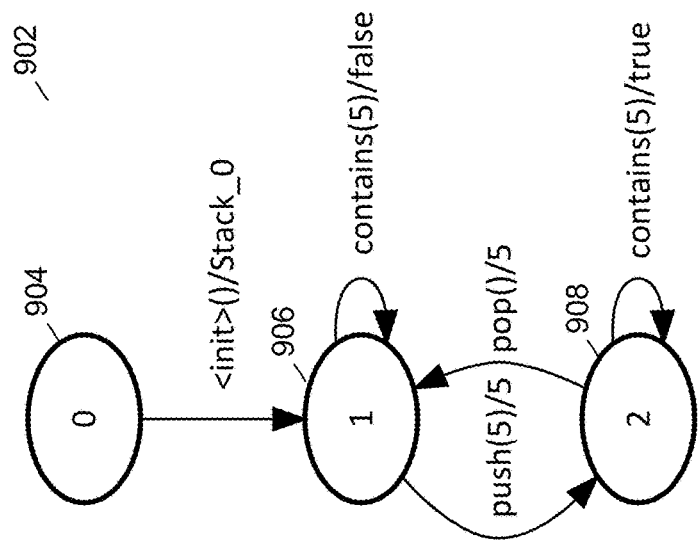
FIG. 9 illustrates a state diagram for a learned software component and interface without objects labels according to an example embodiment.

Embodiments of state diagram visualizer 114 can generate a state diagram visualization based on the above parsed state data. FIG. 9 illustrates a state diagram for a learned software component and interface without objects labels according to an example embodiment. Diagram 902 illustrates states 904, 906, and 908, as well as state transitions (e.g., based on calls to <init>( ), push( ), pop( ), and contains( )), however the object label (e.g., stack object) is not included in the visualization.

In some embodiments, the learned state information for a software component and interface under test can include exceptions (e.g., run-time exceptions). For example, embodiments of the injected supplemental code (e.g., configured to learn and record state information for the software component and interface under test) can be configured to generate/record exception information when an exception is encountered during execution (e.g., execution of software code 102 with injected supplemental code) and parser 110 of FIG. 1 can be configured with state logic that labels an exception state.

Figure 10:
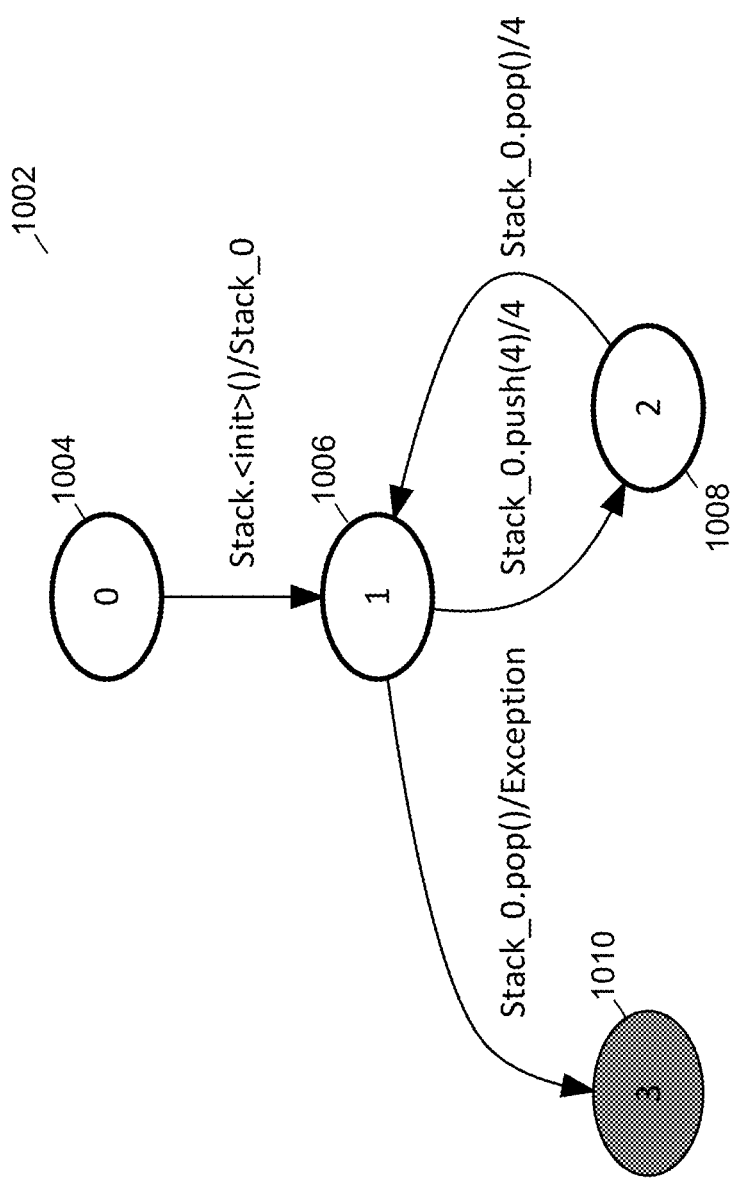
FIG. 10 illustrates a state diagram for a learned software component and interface with an exception state according to an example embodiment.

FIG. 10 illustrates a state diagram for a learned software component and interface with an exception state according to an example embodiment. For example, state diagram visualizer 114 can generate a state diagram visualization based on parsed state information that includes an exception state. Diagram 1002 illustrates states 1004, 1006, and 1008, and 1010, as well as state transitions. In particular, the transition from state 1006 based on the Stack_0.pop( ) call generates an exception (because the stack is empty) and transitions to state 1010 (an exception state).

In some embodiments, a custom abstraction can be defined to configure the software component and interface learning and visualization. For example, the information learned and recorded by the supplemental code (e.g., aspects or pointcuts injected into the software code) and parsed by parser 110 to generate state information and state transitions can be configured based on a custom abstraction.

For example, the custom abstraction can be used to define the different states of a software element (e.g., object) of a software component and interfaces under test (e.g., class). Below is an example custom abstraction for a stack programming structure stackIsEmpty:

```
public static String stackIsEmpty(Object obj)
{
    assertTrue(obj instanceof Stack);
    Stack<Object> s = (Stack<Object>) obj;
    return "Empty=" + String.valueOf(s.isEmpty( ));
}
```

In some embodiments, custom abstractions can be enumerated for specific programming elements (e.g., objects), such as for the stack object:

```
// Define the abstraction methods for stack object.
static final Map<Class<?>, String> stateDataDefnMap = new HashMap<Class<?>, String>( ) {
    {
        put(java.util.Stack.class, " stackIsEmpty ");
    }
};
```

When the state learning and parsing of embodiments is configured using the above custom abstraction, the learned and recorded state of a stack object can be defined by whether it is empty or not. In other examples in previously disclosed embodiments, the state of a stack may be defined by a more fine-grained quality (e.g., the number of elements in the stack, the particular elements in the stack and their order, and the like).

For example, below is example software code 102 of FIG. 1 that can be used with the above custom abstraction:

```
public void test( ) {
    Stack<Integer> stack = new Stack<Integer>( );
    stack.push(5);
    stack.contains(5);
    stack.pop( );
    stack.contains(5);
}
```

In the above example series of events (e.g., test) a stack programming structure is instantiated, and the series of events manipulates or views the stack object (e.g., using interface calls stack.push( ), stack.contains( ), and stack.pop( )), such that the state of the stack object is changed. Referring back to FIG. 1, software code 102 can include the above series of events to test the software component, and this code can be injected with supplemental code (by supplemental code injection 106), executed (by code execution 108), and parsed (by parser 110) to generate parsed state data for the software component under test given the sets of events. Example parsed state data according to some embodiments is below:

```
digraph MealyMachine {
    size="12.13"
    node [style=bold];
    "" -> "Stack_0: Empty=true;" [label = "Stack.<init>( )/Stack_0"]
    "Stack_0: Empty=true;" -> "Stack_0: Empty=false;" [label = "Stack_0.push(5)/5"]
    "Stack_0: Empty=true;" -> "Stack_0: Empty=true;" [label = "Stack_0.contains(5)/false"]
    "Stack_0: Empty=false;" -> "Stack_0: Empty=false;" [label = "Stack_0.contains(5)/true"]
    "Stack_0: Empty=false;" -> "Stack_0: Empty=true;" [label = "Stack_0.pop( )/5"]
}
```

Figure 11:
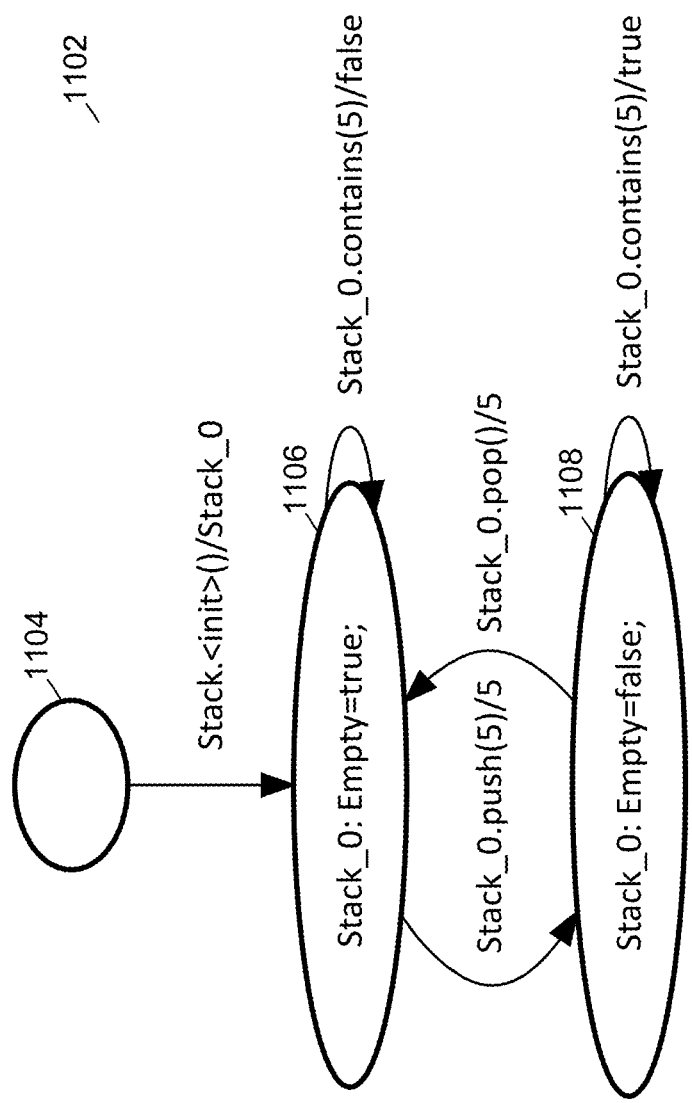
FIG. 11 illustrates a state diagram for a learned software component and interface with a custom abstraction according to an example embodiment.

Embodiments of state diagram visualizer 114 can generate a state diagram visualization based on the above parsed state data. FIG. 11 illustrates a state diagram for a learned software component and interface with a custom abstraction according to an example embodiment. Diagram 1102 illustrates states 1104, 1106, and 1108, as well as state transitions (e.g., based on calls to <init>( ), push( ), and pop( )). Because the custom abstraction stackIsEmpty is used to differentiate between states, state 1106 is defined by an empty state for the stack and state 1108 is defined by a non-empty state for the stack.

In some embodiments, a custom abstraction can result in inconsistent learned states and/or state transitions for a software element (e.g., object). Consider the custom abstraction stackIsEmpty, and the below example series of events (e.g., test):

```
public void test56( ) {
    Stack<Integer> stack = new Stack<Integer>( );
    stack.push(5);
    stack.push(6);
    stack.pop( );
    stack.pop( );
}
```

In the above example series of events (e.g., test) a stack programming structure is instantiated, and the series of events manipulates the stack object (e.g., using interface calls stack.push( ) and stack.pop( )), such that the state of the stack object is changed. Referring back to FIG. 1, software code 102 can include the above series of events to test the software component, and this code can be injected with supplemental code (by supplemental code injection 106), executed (by code execution 108), and parsed (by parser 110) to generate parsed state data for the software component under test given the sets of events. Example parsed state data according to some embodiments is below:

```
digraph MealyMachine {
    size="12.13"
    node [style=bold];
    "" -> "Stack_0: Empty=true;" [label = "Stack.<init>( )/Stack_0"]
    "Stack_0: Empty=true;" -> "Stack_0: Empty=false;" [label = "Stack_0.push(5)/5"]
    "Stack_0: Empty=false;" -> "Stack_0: Empty=false;" [label = "Stack_0.pop( )/6"]
    "Stack_0: Empty=false;" -> "Stack_0: Empty=true;" [label = "Stack_0.pop( )/5"]
    "Stack_0: Empty=false;" -> "Stack_0: Empty=false;" [label = "Stack_0.push(6)/6"]
}
```

Figure 12:
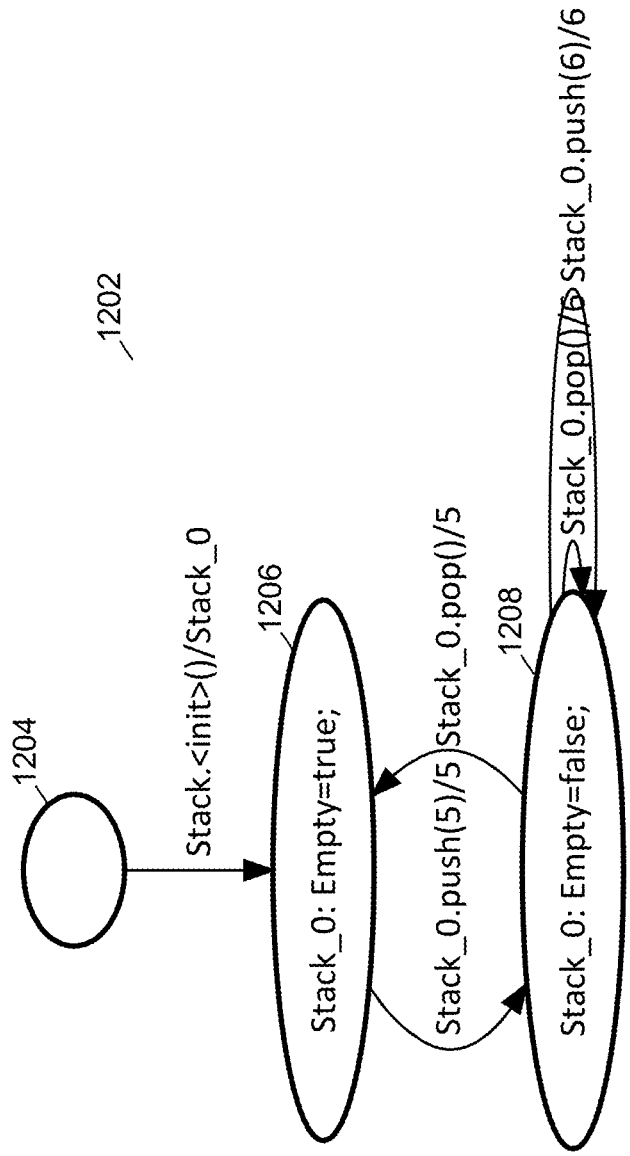
FIG. 12 illustrates a state diagram for a learned software component and interface with a custom abstraction and inconsistency according to an example embodiment.

This example parsed state data results in a state diagram visualization with inconsistency. Embodiments of state diagram visualizer 114 can generate a state diagram visualization based on the above parsed state data. FIG. 12 illustrates a state diagram for a learned software component and interface with a custom abstraction and inconsistency according to an example embodiment. Diagram 1202 illustrates states 1204, 1206, and 1208, as well as state transitions (e.g., based on calls to <init>( ), push( ), and pop( )). Because the custom abstraction stackIsEmpty is used to differentiate between states, state 1206 is defined by an empty state for the stack and state 1208 is defined by a non-empty state for the stack.

However, when stack.pop( ) is called from state 1208, the learned behavior of the stack (according to the series of events, or test, above) is inconsistent since at times the pop( ) call transitions back to state 1206 and at times the pop( ) call remains at state 1208. Intuitively, this can be explained because the custom abstraction stackIsEmpty does not differentiate states based on a number of elements in the stack, and thus inconsistent behavior is the result.

Embodiments of parser 110 of FIG. 1 can parse state information with inconsistency to configure a visualization that visually distinguishes an inconsistency. Given the above scenario, another example parsed state data according to embodiments that implement a parser which distinguishes inconsistencies is below:

```
digraph MealyMachine {
    size="12.13"
    node [style=bold];
    0[tooltip=""]
```

```
1[tooltip="Stack_0: Empty=true;"]
2[tooltip="Stack_0: Empty=false;"]
    0 -> 1 [label = "<init>( )/Stack_0"]
    1 -> 2 [label = "push(5)/5"]
    2 -> 1 [label = "pop( )/5" style = "dashed"]
    2 -> 2 [label = "push(5)/5"]
    2 -> 2 [label = "pop( )/5" style = "dashed"]
}
```

Figure 13:
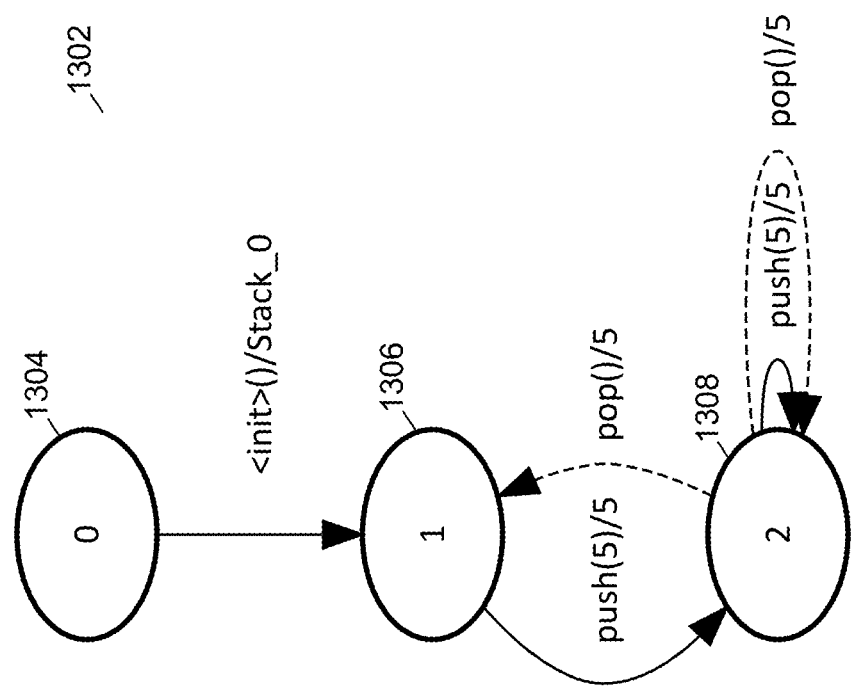
FIG. 13 illustrates a state diagram for a learned software component and interface with a custom abstraction and distinguished inconsistency according to an example embodiment.

This example parsed state data also results in a state diagram visualization with inconsistency, however this inconsistency distinguished using the "dashed" style state transition. Embodiments of state diagram visualizer 114 can generate a state diagram visualization based on the above parsed state data. FIG. 13 illustrates a state diagram for a learned software component and interface with a custom abstraction and distinguished inconsistency according to an example embodiment. Diagram 1302 illustrates states 1304, 1306, and 1308, as well as state transitions (e.g., based on calls to <init>( ), push( ), and pop( )). Because the custom abstraction stackIsEmpty is used to differentiate between states, state 1306 is defined by an empty state for the stack and state 1308 is defined by a non-empty state for the stack.

Similar to FIG. 12, when stack.pop( ) is called from state 1308, the learned behavior of the stack (according to the series of events, or test, above) is inconsistent since at times the pop( ) call transitions back to state 1306 and at times the pop( ) call remains at state 1308. In this embodiment, the parser and visualizer distinguish state transitions that are inconsistent with a dashed line (as seen in FIG. 13).

Another example custom abstraction that defines a stack-ToString abstraction is below:

```
// Define the abstraction methods for different object types.
static final Map<Class<?>, String> stateDataDefnMap = new
HashMap<Class<?>, String>( ) {
    {
        put(java.util.Stack.class, "stackToString");
        put(java.util.Vector.class, "vectorSize");
    }
};
public static String stackToString(Object obj)
{
    assertTrue(obj instanceof Stack);
    return obj.toString( );
}
```

In some embodiments, certain software elements, such as attributes, variables, or other elements, can be excluded from the learned, recorded, and visualized states and state transitions. For example, attributes to be excluded can be enumerated (e.g., within a Hashmap), as demonstrated below with the 'modCount' attribute:

```
private static final Map<String, String> stateVarExcMap = new
HashMap<String, String>( ) {
    {
        put("java.util.AbstractList", "modCount");
        put("java.util.ArrayList.Itr",
"lastRet;cursor;expectedModCount");
    }
};
```

In some embodiments, a group of variables may be excluded from the monitoring, learning, state logic, and visualization. For example, embodiments can be configured to ignore static variables from the state space definitions.

Some embodiments implement the following components to learn state data for a software component and interface under test and visualize the states and state transitions: a) AspectJ pointcuts for monitoring, b) user-defined state abstraction, and c) a parser to generate Mealy machine models. For example, AspectJ pointcuts can be weaved into software code with a series of events (e.g., a test or sample program) to produce raw state data. In some embodiments where tests or samples are not used, fuzz or random testing tools can be used to generate a collection of random samples.

In embodiments state is represented as the state of each object (or static method), which is defined as the value of its attributes. Embodiments that include user-defined state definitions allow the user to define the meaning of a state, and thus configure how the software component and interface under test is monitored and configure how the state diagram visualization depicts the behavior of the software component and interface. In some embodiments, a raw log file contains the state information for the software component and interface under test (e.g., given the series or events, or tests, executed). For example, the supplemental code (e.g., AspectJ pointcuts) can monitor and record this state information in one or more log files.

In some embodiments, the parser can convert this low-level data (e.g., log files) into a high-level model called a Mealy machine. For example, the parser can use state logic (e.g., logic to differentiate between states) to generate one or more DOT files (e.g., parsed state data), or files used to define a directed graph. These DOT files can then be used to configure the state diagram visualization (e.g., using Dotty or any other visualization tool configured to visualize directed graphs or similar structures) that visually depicts the behavior of the software component and interface under test.

Figure 14:
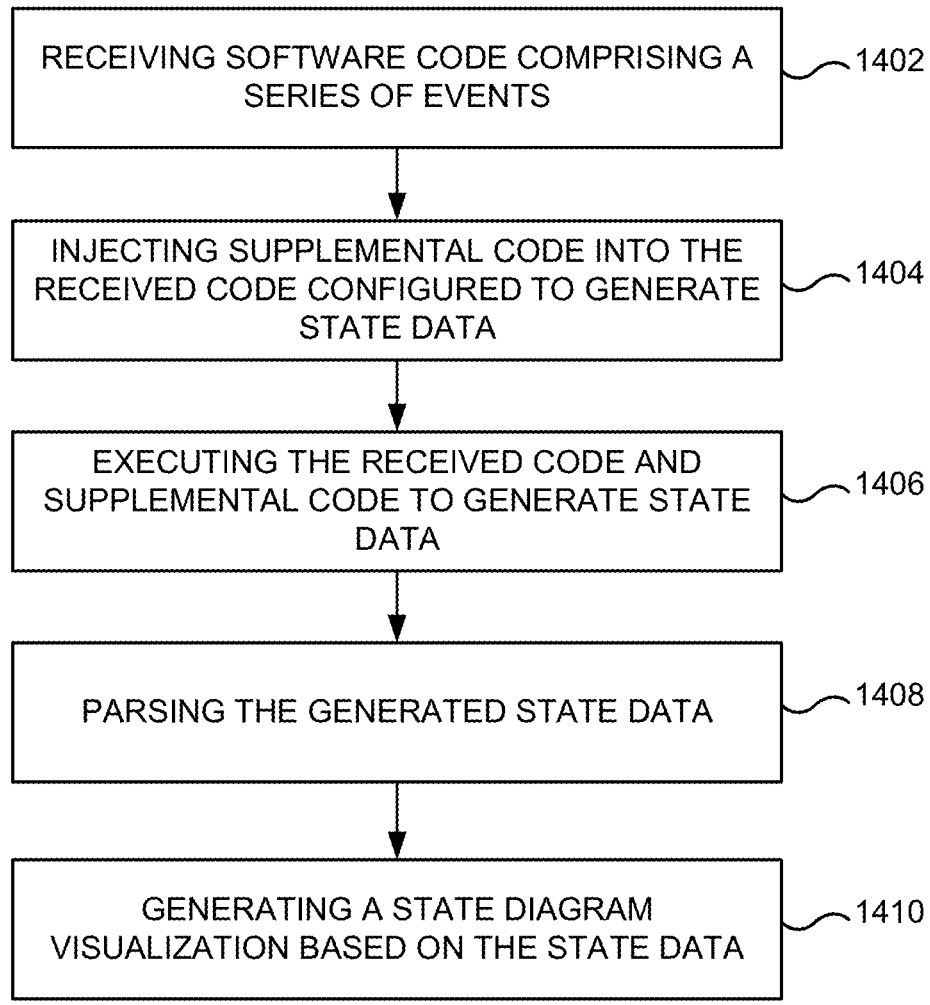
FIG. 14 illustrates flow diagram for learning and visualizing state data for a software component and interface according to an example embodiment.

FIG. 14 illustrates flow diagram for learning and visualizing state data for a software component and interface according to an example embodiment. In one embodiment, the functionality of FIG. 14 (and FIG. 15 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1402, software code including a series of events can be received, where the series of events includes calls to a software component and interface under test. For example, the software interface can be an API for a class, method, or other suitable software component, and the received software code can include a series of events designed to test the software interface and component. For example, the series of events can manipulate one or more elements of the software component and interface.

At 1404, supplemental code can be injected into the received code. For example, the supplemental code be configured to learn state data for software elements (e.g., objects, static methods, or any other software element) given the series of events in the received software code. In some embodiments, the supplemental code injection is implemented using aspect-oriented programming techniques.

At 1406, the software code with the injected supplemental code can be executed, where the executed supplemental code generates state data for the software component and interface under test. For example, one or more elements of the software component and interface can be objects or static methods of the software component and interface.

At 1408, the generated state data for the one or more elements of the software component and interface can be parsed. For example, a parser can be used to parse the state data into state and state transitions data. At 1410, based on the generated state data (and parsed state data), a state diagram visualization can be generated that visualizes states and state transitions for the software component and interface under test given the series of events. In some embodiments, and the state diagram visualization visualizes states and state transitions for the one or more elements of the software component and interface.

In some embodiments, the software component and interface is a class of a programming interface. The series of events can instantiate at least one new object of the software component and interface, and the states and state transitions visualized by the state diagram visualization can be at least state transitions for the new instantiated object. In some embodiments, the new object includes attributes, the series of events manipulate at least a portion of the attributes, and the states and state transitions visualized by the state diagram visualization can be at least state transitions from different attributes values of the new object.

Figure 15:
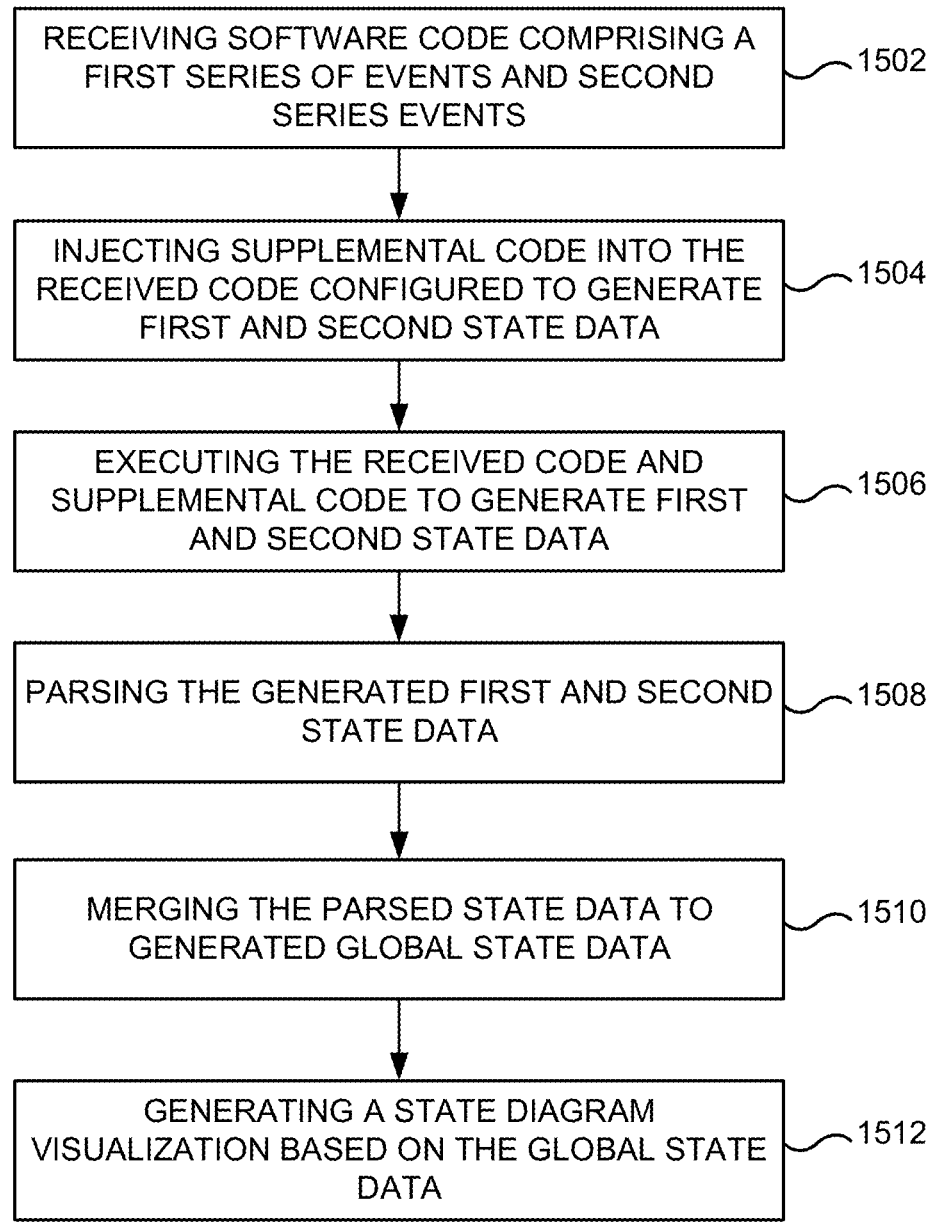
FIG. 15 illustrates a flow diagram for learning, merging, and visualizing a software interface according to an example embodiment.

FIG. 15 illustrates a flow diagram for learning, merging, and visualizing a software interface according to an example embodiment. The functionality of 1502, 1504, 1506, 1508, and 1512 can be similar to 1402, 1404, 1406, 1408, and 1410 of FIG. 9.

At 1502, software code including a first series of events and a second series of events can be received, where the first series of events and second series of events include calls to a software component and interface under test. For example, the software interface can be an API for a class, method, or other suitable software component, and the received software code can include a first and second series of events designed to test the software component and interface. For example, the first series of events can manipulate one or more first elements of the software component and interface and the second series of events can manipulate one or more second elements of the software component and interface.

At 1504, supplemental code can be injected into the received code. For example, the supplemental code be configured to learn first state data for the first software elements (e.g., objects, static methods, or any other software element) given the first series of events and second state data for the second software elements (e.g., objects, static methods, or any other software element) given the second series of events. In some embodiments, the supplemental code injection is implemented using aspect-oriented programming techniques.

At 1506, the software code with the injected supplemental code can be executed, where the executed supplemental code generates first state data and second state data for the software component and interface under test. At 1508, the generated first state data for the one or more first elements and second state data for the one or more second elements can be parsed. For example, a parser can be used to parse the state data into state and state transitions data. In some embodiments, the one or more first elements and the one or more second elements comprise objects or static methods of the software component and interface. At 1510, the parsed first state data and the parsed second state data can be merged to generate global state data for the software component and interface.

At 1512, based on the generated global state data, a state diagram visualization that visualizes states and state transitions for the software component and interface based on the global state data given the first series of events and the second series of events. In some embodiments, the software component and interface is a class of a programming interface.

In some embodiments, the first series of events can instantiate one or more first objects of the software component and interface or can manipulate one or more attributes of the one or more first objects and the second series of events can manipulate one or more static methods of the software component and interface. In some embodiments, the new object includes attributes, the first series of events manipulate at least a portion of the attributes, and the states and state transitions visualized by the state diagram visualization can be at least state transitions from different attributes values of the new object. In some embodiments, the first series of events is a sequence of events defining a first test for the software component and interface and the second series of events is a sequence of events defining a second test for the software component and interface.

Embodiments learn and visualize a software component and interface. For example, software functionality (e.g., an application) can often be accomplished by components of software interacting via interfaces. In some embodiments, software components can be modules or chunks of code that perform specified functions. A given component can use an application programming interface ("API") to abstract the functionality accomplished by the component. For example, a mathematical software component that performs a specified math function on input passed to the component can include an API that specifies the function name/path and the expected input (e.g., number and type of parameters passed).

At times, software interfaces can become complex and/or changes to a specific software component can result in unexpected behavior when calling the specific software component's interface. This, in addition to other challenges, can result in flawed interactions between software components, failed applications/functionality, and ultimately increased downtime. In addition, changes or updates to a software component are often accompanied by testing to ensure the updated software component will integrate well with other/existing components. However, the component testing often leaves gaps in behavior and generate results that fail to comprehensively communicate the behavior of the component under test.

Embodiments learn and visualize the behavior of a software interface, and thus the underlying software component that is associated with the interface. For example, software code that includes a series of events, such as test events, can be used to learn the behavior of a software component and interface. In some embodiments, supplemental code is injected in the software code with the series of events, and this supplemental code can be configured to generate state data for the software component and interface under test. The state data learned using the supplemental code can reflect that changing state of software elements over time while executing the series of events (e.g., testing)

In some embodiments, this state data can be used to generate a state diagram visualization that visualizes states and state transitions for the software component and interface under test given the series of events. For example, the elements of software, their states, and the state transitions that are seen over time while executing the series of events (e.g., test) can be visualized by the state diagram visualization. In other words, the behavior of the software component and interface given the set of circumstances presented by the series of events can be learned and visualized by embodiments.

This visualization aids in the testing of software components and interfaces since the software component's internal behavior is visually communicated to a user or tester. In addition, the state diagram visualization can further be used to understand the software component and to setup safeguards around the software component's interactions that ensure proper functionality. Embodiments can be used to learn a comprehensive view of the behavior of software interfaces and components and interfaces to ultimately achieve a more robust system of components.

Embodiments also efficiently utilize computing resources by learning and communicating the behavior of a software component and interface at depth without the need for excessive testing. Because the internal states of software elements are learned and recorded by embodiments when executing a test, the software component and interface can be relied on at production while undergoing less testing than conventional techniques (which do not learn and communicate the internal states of the software elements). In other words, embodiments enable production ready software components for a system with less testing and using less processing power than conventional techniques.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for learning and visualizing a software component and interface, the method comprising:
   receiving software code comprising a series of events, wherein the series of events comprise calls to a software component and interface under test that manipulate one or more objects of the software component and interface;
   injecting supplemental code into the received code;
   executing the software code with the injected supplemental code, wherein the executed supplemental code generates state data for the one or more objects of the software component and interface; and
   generating, based on the generated state data, a graph visualization that visualizes states and state transitions for the one or more objects of the software component and interface given the series of events, wherein nodes of the graph represent visualized states for at least a first of the one or more objects of the software component and interface, the visualized states correspond to different states of one or more attributes of the first object, and connections among the nodes of the graph represent state transitions for the one or more attributes of the first object.

2. The method of claim 1, wherein the one or more objects comprise objects or static methods of the software component and interface.

3. The method of claim 2, wherein the software component and interface comprises a class of a programming interface.

4. The method of claim 2, wherein the series of events instantiate at least one new object of the one or more objects of the software component and interface, and the states and state transitions visualized by the graph visualization comprise at least state transitions for the new instantiated object.

5. The method of claim 2, further comprising: parsing the generated state data for the one or more objects of the software component and interface, wherein the graph visualization is generated using the parsed state data.

6. The method of claim 5, wherein,
   the software code comprising the series of events comprises first code with a first series of events that manipulate one or more first objects of the software component and interface and second code with a second series of events that manipulate one or more second objects of the software component and interface,
   supplemental code is injected into the first code and the second code such that the executed supplemental code generates first state data based on the first series of events and second state data based on the second series of events, and
   parsing the generated state data comprises parsing the first state data and the second state data.

7. The method of claim 6, further comprising: merging the parsed first state data and the parsed second state data to generate global state data for the software component and interface, wherein the generated graph visualization visualizes states and state transitions for the software component and interface based on the global state data given the first series of events and the second series of events.

8. The method of claim 7, wherein the first series of events comprises a sequence of events defining a first test for the software component and interface and the second series of events comprises a sequence of events defining a second test for the software component and interface.

9. The method of claim 1, wherein the graph visualization comprises a directed graph.

10. A system for learning and visualizing a software component and interface, the system comprising:
    a processor; and
    memory storing instructions for execution by the processor, the instructions configuring the processor to:
    receive software code comprising a series of events, wherein the series of events comprise calls to a software component and interface under test that manipulate one or more objects of the software component and interface;
    inject supplemental code into the received code;
    execute the software code with the injected supplemental code, wherein the executed supplemental code generates state data for the one or more objects of the software component and interface; and generate, based on the generated state data, a graph visualization that visualizes states and state transitions for the one or more objects of the software component and interface given the series of events, wherein nodes of the graph represent visualized states for at least a first of the one or more objects of the software component and interface, the visualized states correspond to different states of one or more attributes of the first object, and the connections among the nodes of the graph represent state transitions for the one or more attributes of the first object.

11. The system of claim 10, wherein the one or more objects comprise objects or static methods of the software component and interface.

12. The system of claim 11, wherein the software component and interface comprises a class of a programming interface.

13. The system of claim 11, wherein the series of events instantiate at least one new object of the one or more objects of the software component and interface, and the states and state transitions visualized by the graph visualization comprise at least state transitions for the new instantiated object.

14. The system of claim 11, wherein the instructions further configure the processor to: parse the generated state data for the one or more objects of the software component and interface, wherein the graph visualization is generated using the parsed state data.

15. The system of claim 10, wherein the graph visualization comprises a directed graph.

16. A non-transitory computer readable medium having instructions stored thereon that, when executed by a processor, cause the processor to learn and visualize a software component and interface, wherein, when executed, the instructions cause the processor to:

receive software code comprising a series of events, wherein the series of events comprise calls to a software component and interface under test that manipulate one or more objects of the software component and interface;

inject supplemental code into the received code;

execute the software code with the injected supplemental code, wherein the executed supplemental code generates state data for the one or more objects of the software component and interface; and generate, based on the generated state data, a graph visualization that visualizes states and state transitions for the one or more objects of the software component and interface given the series of events, wherein nodes of the graph represent visualized states for at least a first of the one or more objects of the software component and interface, the visualized states correspond to different states of one or more attributes of the first object, and connections among the nodes of the graph represent state transitions for the one or more attributes of the first object.

17. The computer readable medium of claim 16, wherein the graph visualization comprises a directed graph.

* * * * *